US011978385B2

(12) United States Patent
Shi et al.

(10) Patent No.: US 11,978,385 B2
(45) Date of Patent: May 7, 2024

(54) TWO-DIMENSIONAL CONTENT-ADAPTIVE COMPENSATION TO MITIGATE DISPLAY VOLTAGE DROP

(71) Applicant: Apple Inc., Cupertino, CA (US)

(72) Inventors: Yao Shi, Sunnyvale, CA (US); Wei H Yao, Palo Alto, CA (US); Hyunwoo Nho, Palo Alto, CA (US); Jie Won Ryu, Santa Clara, CA (US); Kingsuk Brahma, Mountain View, CA (US); Li-Xuan Chuo, San Jose, CA (US); Hyunsoo Kim, San Diego, CA (US); Myungjoon Choi, San Jose, CA (US); Ce Zhang, Cupertino, CA (US); Alex H Pai, Milpitas, CA (US); Shengkui Gao, Shoreline, WA (US); Rungrot Kitsomboonloha, San Jose, CA (US); Shatam Agarwal, San Jose, CA (US); Vehbi Calayir, Santa Clara, CA (US); Chaohao Wang, Sunnyvale, CA (US); Steven N Hanna, San Jose, CA (US); Pei-En Chang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/889,242

(22) Filed: Aug. 16, 2022

(65) Prior Publication Data

US 2023/0089942 A1 Mar. 23, 2023

Related U.S. Application Data

(60) Provisional application No. 63/247,181, filed on Sep. 22, 2021.

(51) Int. Cl.
*G09G 3/20* (2006.01)

(52) U.S. Cl.
CPC ......... *G09G 3/2096* (2013.01); *G09G 3/2007* (2013.01); *G09G 2310/0291* (2013.01); *G09G 2320/0223* (2013.01); *G09G 2320/0233* (2013.01); *G09G 2330/021* (2013.01); *G09G 2360/16* (2013.01)

(58) Field of Classification Search
CPC ............... G09G 3/2096; G09G 3/2007; G09G 2310/0291; G09G 2320/0223; G09G 2320/0233; G09G 2330/021; G09G 2360/16; G09G 2310/0275; G09G 3/2092; G09G 2320/0271
USPC .......................................................... 345/690
See application file for complete search history.

(56) References Cited

U.S. PATENT DOCUMENTS

| | | | | |
|---|---|---|---|---|
| 9,715,849 B2 | 7/2017 | Fujii | | |
| 9,918,367 B1 * | 3/2018 | Scenini | .................. | H05B 47/00 |
| 10,810,943 B2 | 10/2020 | Yum | | |
| 2012/0206504 A1 * | 8/2012 | Ha | ....................... | G09G 3/3208 345/690 |

(Continued)

*Primary Examiner* — Amare Mengistu
*Assistant Examiner* — Gloryvid Figueroa-Gibson
(74) *Attorney, Agent, or Firm* — Fletcher Yoder, P.C.

(57) ABSTRACT

This disclosure provides various techniques for providing fine-grain digital and analog pixel compensation to account for voltage error across an electronic display. By employing a two-dimensional digital compensation and a local analog compensation, a fine-grain and robust pixel compensation scheme may be provided to the electronic display.

20 Claims, 21 Drawing Sheets

(56) References Cited

U.S. PATENT DOCUMENTS

| | | | | |
|---|---|---|---|---|
| 2012/0320024 | A1* | 12/2012 | Ebisuno | G09G 3/3233 345/212 |
| 2019/0295454 | A1* | 9/2019 | Urabe | G09G 3/22 |
| 2019/0340980 | A1* | 11/2019 | Yum | G09G 3/3225 |
| 2020/0112654 | A1* | 4/2020 | Saito | H04N 5/202 |
| 2020/0143750 | A1* | 5/2020 | Gao | H10K 59/121 |
| 2020/0279519 | A1 | 9/2020 | Orio | |
| 2021/0043150 | A1* | 2/2021 | Lee | G09G 3/3291 |
| 2021/0319750 | A1* | 10/2021 | Ueno | G09G 3/3233 |

* cited by examiner

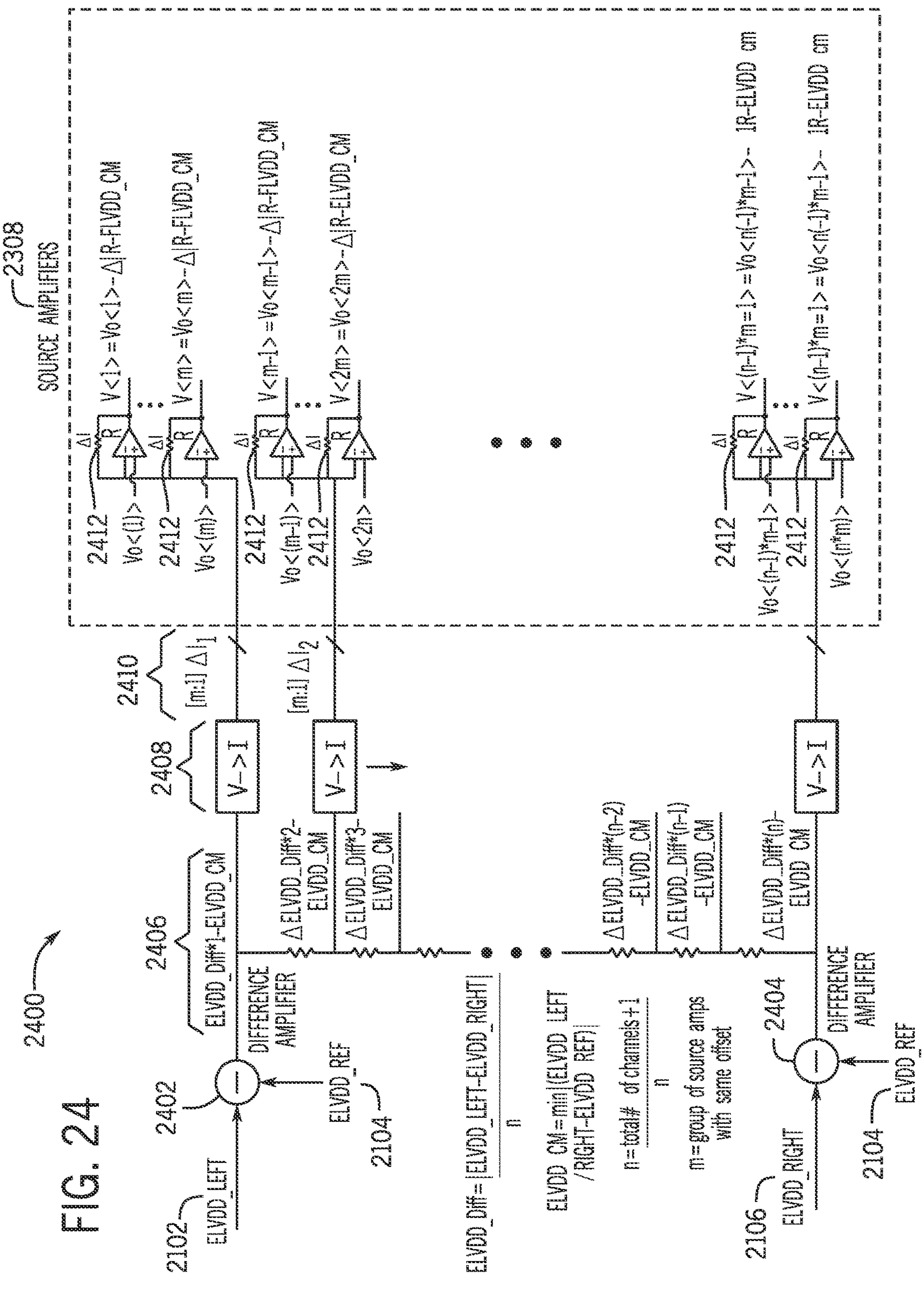
FIG. 24
2400
2102
ELVDD LEFT
2402
DIFFERENCE AMPLIFIER
ELVDD REF
2104
2406
ELVDD Diff*1-ELVDD CM
Δ ELVDD_Diff*2-ELVDD_CM
Δ ELVDD_Diff*3-ELVDD_CM
Δ ELVDD_Diff*(n-2) -ELVDD_CM
Δ ELVDD_Diff*(n-1) -ELVDD_CM
Δ ELVDD_Diff*(n)-ELVDD CM
2408
V->I
2410
[m:1] ΔI1
[m:1] ΔI2
ELVDD Diff= |ELVDD LEFT-ELVDD_RIGHT| / n
ELVDD CM=min|(ELVDD LEFT /RIGHT-ELVDD REF)|
n=total# of channels+1 / n
m=group of source amps with same offset
2106
ELVDD RIGHT
2404
DIFFERENCE AMPLIFIER
ELVDD REF
2104
2308
SOURCE AMPLIFIERS
2412
ΔI
R
Vo<(1)>
Vo<(m)>
Vo<(m-1)>
Vo<2n>
Vo<(n-1)*m-1>
Vo<(n*m)>
V<1> =Vo<1>-Δ|R-ELVDD CM
V<m> =Vo<m>-Δ|R-ELVDD_CM
V<m-1> =Vo<m-1>-Δ|R-ELVDD_CM
V<2m> =Vo<2m>-Δ|R-ELVDD_CM
V<(n-1)*m-1> =Vo<n(-1)*m-1>- 1R-ELVDD cm
V<(n-1)*m-1> =Vo<n(-1)*m-1>- 1R-ELVDD cm

TWO-DIMENSIONAL CONTENT-ADAPTIVE COMPENSATION TO MITIGATE DISPLAY VOLTAGE DROP

CROSS-REFERENCE TO RELATED APPLICATIONS

This application claims priority to U.S. Provisional Application No. 63/247,181, filed Sep. 22, 2021, entitled "Two-Dimensional Content-Adaptive Compensation to Mitigate Display Voltage Drop," the disclosure of which is incorporated by reference in its entirety for all purposes.

SUMMARY

This disclosure relates to systems and methods for content-adaptive compensation for two-dimensional voltage error in an electronic display.

A summary of certain embodiments disclosed herein is set forth below. It should be understood that these aspects are presented to provide the reader with a brief summary of these certain embodiments and that these aspects are not intended to limit the scope of this disclosure.

Electronic displays may be found in numerous electronic devices, from mobile phones to computers, televisions, automobile dashboards, and augmented reality or virtual reality glasses, to name just a few. Electronic displays with self-emissive display pixels produce their own light. Self-emissive display pixels may include any suitable light-emissive elements, including light-emitting diodes (LEDs) such as organic light-emitting diodes (OLEDs) or micro-light-emitting diodes (μLEDs). By causing different display pixels to emit different amounts of light, individual display pixels of an electronic display may collectively produce images.

The self-emissive display pixels of the electronic display consume electrical energy to emit the light, which is supplied by a power supply. As the power supply delivers voltage to a column of pixels, however, the voltage supplied may drop as the voltage is delivered to pixels further away from the power supply due to internal resistance of the conductive wires and/or the LEDs themselves. For this reason, the voltage error or voltage drop is also often referred to as IR error or IR drop, corresponding to the electrical principle that voltage (V) is equal to current (I) multiplied by resistance (R) in a circuit. The voltage error may cause the pixels to output a different luminance (and, by extension, a different color) than intended. This could negatively impact the picture quality of the electronic display.

To account for the voltage error experienced by the pixels further away from the power supply, some electronic displays may employ systems and methods for one-dimensional voltage compensation schemes. The one-dimensional voltage compensation schemes may account for the drop in voltage linearly; that is, the one-dimensional voltage compensation schemes may provide greater voltage compensation proportional to the distance between the pixel and the power supply. However, the magnitude of the voltage error across the display may not necessarily be linear, and indeed may vary depending on the location probed and/or the content displayed on the electronic device display. For example, a higher-luminance portion of the display may correlate to a larger voltage error while a lower-luminance portion may correlate to a smaller voltage error. Additionally, certain compensation schemes rely on per-panel calibration, and one-dimensional compensation schemes may only calibrate at a single point on a display (e.g., the one-dimensional calibration scheme may calibrate a single pixel or zone of pixels at a time). Single-point calibration may lead to low voltage error (i.e., the difference between voltage supplied and voltage measured) near a calibration point and higher voltage error at other areas of the display. Another method of voltage compensation is analog compensation. Analog compensation may compensate for voltage error detected at the ELVDD input of a display panel and may act as a baseline compensation for the entire panel (i.e., global analog compensation). However, global analog compensation may not account for voltage errors that vary from one column of pixels to another.

Thus, in order to account for such non-linear voltage error, a content-adaptive two-dimensional IR drop adjustment (2D digital compensation) pixel compensation scheme and local analog compensation may be employed. A zone map may be superimposed over a display to divide the display into discrete zones, which may be uniform in size or vary depending on the location. The 2D digital compensation scheme may involve receiving image data corresponding to an input image and calculating average pixel luminance of each zone of the display based on the image data. The 2D digital compensation scheme may determine an anticipated voltage error for each zone based on an anticipated voltage error relationship. The anticipated voltage error relationship may relate a modeled or empirically determined voltage error corresponding to average pixel luminance and global brightness (e.g., which together may define the amount of current) for each zone. By estimating an expected average pixel luminance of each zone, the anticipated voltage error (also sometimes referred to as voltage drop) of the zone may be determined. The 2D digital compensation scheme may use the anticipated voltage error of the zones to determine a voltage error across the display. The 2D digital compensation scheme may then combine the anticipated voltage error of each zone to generate a voltage error map for the display using the anticipated voltage error across the display based on the image data. The 2D digital compensation scheme may provide a digital compensation to the image data to compensate for the voltage error across the display.

The local analog compensation scheme may involve sensing voltage error in column-driver integrated circuits (CDICs) to determine a fine-grain voltage error gradient across the CDICs. The local analog compensation scheme may involve performing a voltage compensation across the display based on the determined fine-grain voltage error. As such, by employing the 2D digital compensation and the local analog compensation, a fine-grain and robust pixel compensation scheme may be provided to the display.

BRIEF DESCRIPTION OF THE DRAWINGS

Various aspects of this disclosure may be better understood upon reading the following detailed description and upon reference to the drawings described below in which like numerals refer to like parts.

FIG. 24 is a schematic diagram of a circuit 2400 that is a detailed version of the circuit in FIG. 23, in accordance with an embodiment;

DETAILED DESCRIPTION OF SPECIFIC EMBODIMENTS

Figure 1:
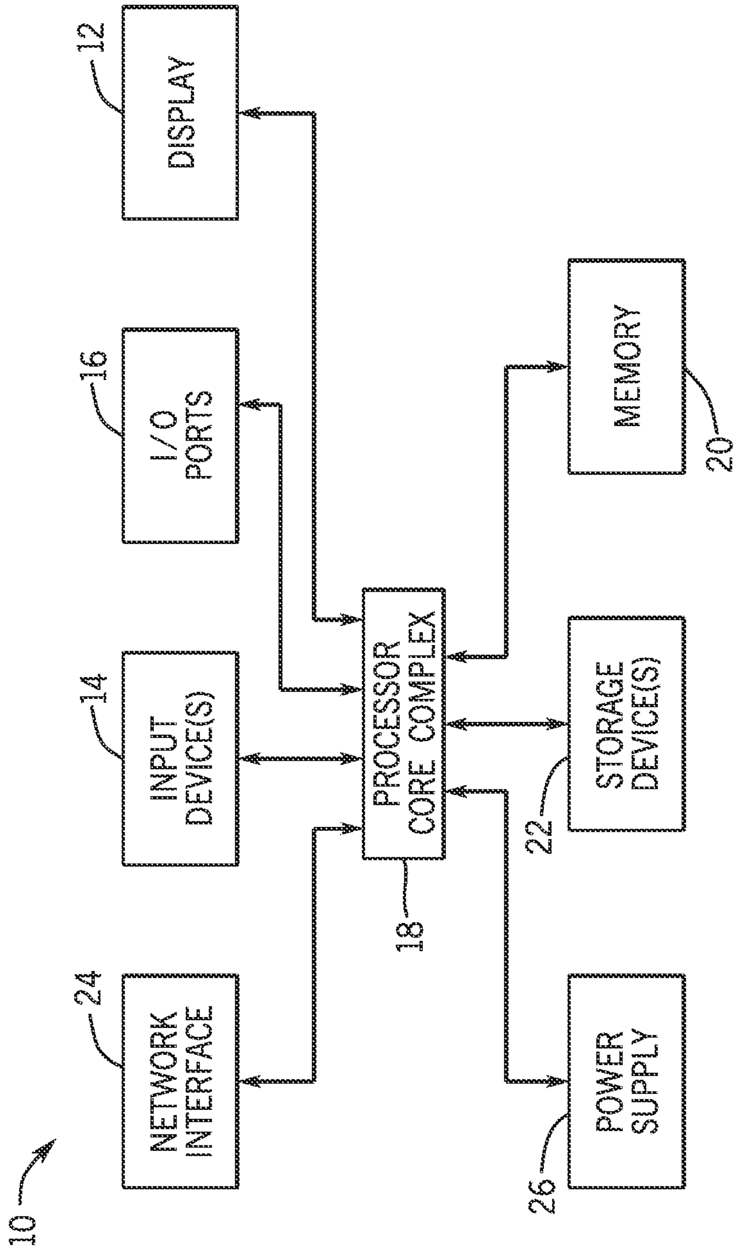
FIG. 1 is a block diagram of an electronic device having an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

The present disclosure provides systems and methods for providing image data compensation to account for voltage error across a display panel. Electronic displays may be found in numerous electronic devices, from mobile phones to computers, televisions, automobile dashboards, wearable devices such as watches, and augmented reality or virtual reality glasses, to name just a few. By causing different display pixels to emit different amounts of light, individual display pixels of an electronic display may collectively produce images. However, as voltage is delivered from a power supply to a pixel in a display the voltage expected to be delivered to the pixel may differ from the voltage actually received at the pixel. This difference between voltage expected and voltage received is referred to herein as voltage error. The voltage error across the display may lead to the pixels outputting a different color and/or luminance that may negatively impact the quality of displayed content.

To account for the voltage error experienced by the pixels further away from the power supply, electronic displays may employ systems and methods for one-dimensional voltage compensation schemes. The one-dimensional voltage compensation schemes may account for the drop in voltage linearly; that is, the one-dimensional voltage compensation schemes may provide greater voltage compensation proportional to the distance between the pixel and the power supply. However, the magnitude of the voltage error across the display may not necessarily be linear, and indeed may vary depending on the location probed and/or the content displayed on the electronic device display. For example, a higher-luminance portion of the display may correlate to a larger voltage error while a lower-luminance portion may correlate to a smaller voltage error. Additionally, certain compensation schemes rely on per-panel calibration, and one-dimensional compensation schemes may only calibrate at a single point on a display (e.g., the one-dimensional calibration scheme may calibrate a single pixel or zone of pixels at a time). Single-point calibration may lead to low voltage error (i.e., the difference between voltage supplied and voltage measured) near a calibration point and higher voltage error at other areas of the display.

Another method of voltage compensation is analog compensation. Analog compensation may compensate for voltage error detected at the ELVDD input of a display panel and may act as a baseline compensation for the entire panel (i.e., global analog compensation). However, global analog compensation may not account for voltage errors that vary from one column of pixels to another.

Thus, in order to account for such non-linear voltage error, a content-adaptive two-dimensional (2D) digital compensation pixel compensation scheme and local analog compensation may be employed. A zone map may be superimposed over a display to divide the display into discrete zones. The 2D digital compensation may receive image data corresponding to an input image and calculate average pixel luminance of each zone of the display based on the image data. The 2D digital compensation may use anticipated voltage error data from a lookup table corresponding to a zone and the average pixel luminance to determine the actual voltage error of the zone; thus enabling the 2D digital compensation to determine a fine-grain voltage error across the display. The 2D digital compensation may then combine the actual voltage error of each zone to generate a voltage error map for the display using the actual voltage error across the display based on the image data. The 2D digital compensation may provide a digital compensation to the image data to compensate for the voltage error across the display. The local analog compensation may sense voltage error at each end of each column-driver integrated circuit (CDIC) in a series of CDICs to determine a fine-grain voltage error gradient across each CDIC. The local analog compensation may perform a voltage compensation across the display based on the determined fine grain voltage error. As such, by employing the 2D digital compensation and the local analog compensation, a fine-grain and robust pixel compensation scheme may be provided to the display.

With this in mind, an example of an electronic device 10, which includes an electronic display 12 that may benefit from these features, is shown in FIG. 1. FIG. 1 is a schematic block diagram of the electronic device 10. The electronic device 10 may be any suitable electronic device, such as a computer, a mobile (e.g., portable) phone, a portable media device, a tablet device, a television, a handheld game platform, a personal data organizer, a virtual-reality headset, a mixed-reality headset, a wearable device, a watch, a vehicle dashboard, and/or the like. Thus, it should be noted that FIG. 1 is merely one example of a particular implementation and is intended to illustrate the types of components that may be present in an electronic device 10.

In addition to the electronic display 12, as depicted, the electronic device 10 includes one or more input devices 14, one or more input/output (I/O) ports 16, a processor core complex 18 having one or more processors or processor cores and/or image processing circuitry, memory 20, one or more storage devices 22, a network interface 24, and a power supply 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the memory 20 and the storage devices 22 may be included in a single component. Additionally or alternatively, image processing circuitry of the processor core complex 18 may be disposed as a separate module or may be disposed within the electronic display 12.

The processor core complex 18 is operably coupled with the memory 20 and the storage device 22. As such, the processor core complex 18 may execute instructions stored in memory 20 and/or a storage device 22 to perform operations, such as generating or processing image data. The processor core complex 18 may include one or more microprocessors, one or more application specific processors (ASICs), one or more field programmable logic arrays (FPGAs), or any combination thereof.

In addition to instructions, the memory 20 and/or the storage device 22 may store data, such as image data. Thus, the memory 20 and/or the storage device 22 may include one or more tangible, non-transitory, computer-readable media that store instructions executable by processing circuitry, such as the processor core complex 18, and/or data to be processed by the processing circuitry. For example, the memory 20 may include random access memory (RAM) and the storage device 22 may include read only memory (ROM), rewritable non-volatile memory, such as flash memory, hard drives, optical discs, and/or the like.

The network interface 24 may enable the electronic device 10 to communicate with a communication network and/or another electronic device 10. For example, the network interface 24 may connect the electronic device 10 to a personal area network (PAN), such as a Bluetooth network, a local area network (LAN), such as an 802.11x Wi-Fi network, and/or a wide area network (WAN), such as a fourth-generation wireless network (4G), LTE, or fifth-generation wireless network (5G), or the like. In other words, the network interface 24 may enable the electronic device 10 to transmit data (e.g., image data) to a communication network and/or receive data from the communication network.

The power supply 26 may provide electrical power to operate the processor core complex 18 and/or other components in the electronic device 10, for example, via one or more power supply rails. Thus, the power supply 26 may include any suitable source of electrical power, such as a rechargeable lithium polymer (Li-poly) battery and/or an alternating current (AC) power converter. A power management integrated circuit (PMIC) may control the provision and generation of electrical power to the various components of the electronic device 10.

The I/O ports 16 may enable the electronic device 10 to interface with another electronic device 10. For example, a portable storage device may be connected to an I/O port 16, thereby enabling the electronic device 10 to communicate data, such as image data, with the portable storage device.

The input devices 14 may enable a user to interact with the electronic device 10. For example, the input devices 14 may include one or more buttons, one or more keyboards, one or more mice, one or more trackpads, and/or the like. Additionally, the input devices 14 may include touch sensing components implemented in the electronic display 12, as described further herein. The touch sensing components may receive user inputs by detecting occurrence and/or position of an object contacting the display surface of the electronic display 12.

In addition to enabling user inputs, the electronic display 12 may provide visual representations of information by displaying one or more images (e.g., image frames or pictures). For example, the electronic display 12 may display a graphical user interface (GUI) of an operating system, an application interface, text, a still image, or video content. To facilitate displaying images, the electronic display 12 may include a display panel with one or more display pixels. The display pixels may represent sub-pixels that each control a luminance of one color component (e.g., red, green, or blue for a red-green-blue (RGB) pixel arrangement).

The electronic display 12 may display an image by controlling the luminance of its display pixels based at least in part image data associated with corresponding image pixels in image data. In some embodiments, the image data may be generated by an image source, such as the processor core complex 18, a graphics processing unit (GPU), an image sensor, and/or memory 20 or storage devices 22. Additionally, in some embodiments, image data may be received from another electronic device 10, for example, via the network interface 24 and/or an I/O port 16.

Figure 2:
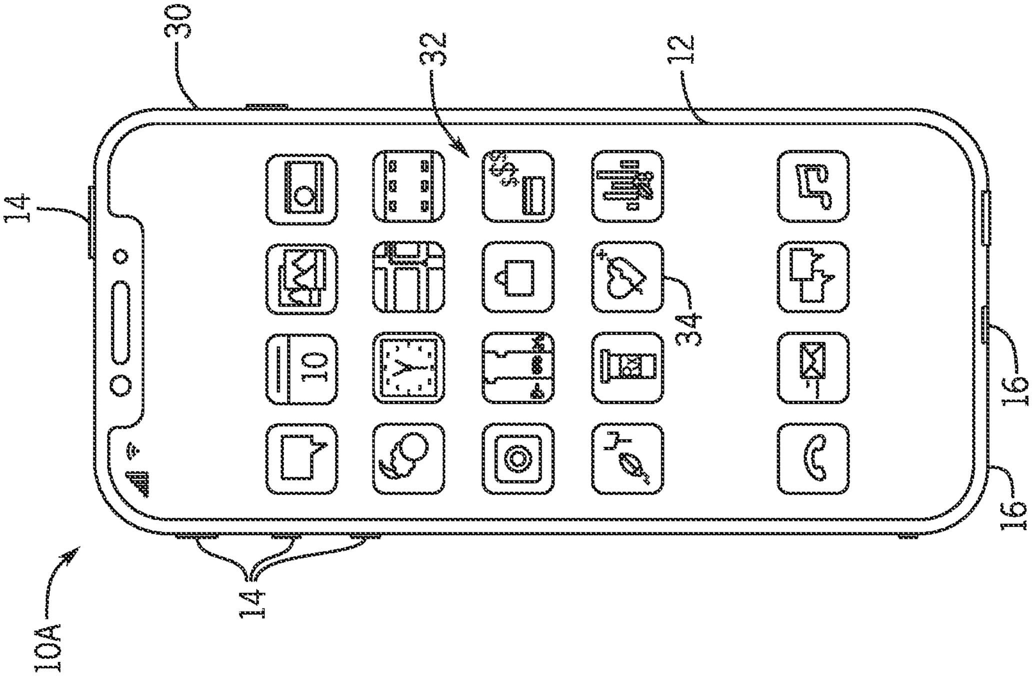
FIG. 2 is an example of the electronic device in the form of a handheld device, in accordance with an embodiment.

One example of the electronic device 10, specifically a handheld device 10A, is shown in FIG. 2. FIG. 2 is a front view of the handheld device 10A representing an example of the electronic device 10. The handheld device 10A may be a portable phone, a media player, a personal data organizer, a handheld game platform, and/or the like. For example, the handheld device 10A may be a smart phone, such as any iPhone® model available from Apple Inc.

The handheld device 10A includes an enclosure 30 (e.g., housing). The enclosure 30 may protect interior components from physical damage and/or shield them from electromagnetic interference. In the depicted embodiment, the electronic display 12 is displaying a graphical user interface (GUI) 32 having an array of icons 34. By way of example, when an icon 34 is selected either by an input device 14 or a touch sensing component of the electronic display 12, an application program may launch.

Input devices 14 may be provided through the enclosure 30. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 also open through the enclosure 30. The I/O ports 16 may include, for example, a Lightning® or Universal Serial Bus (USB) port.

Figure 3:
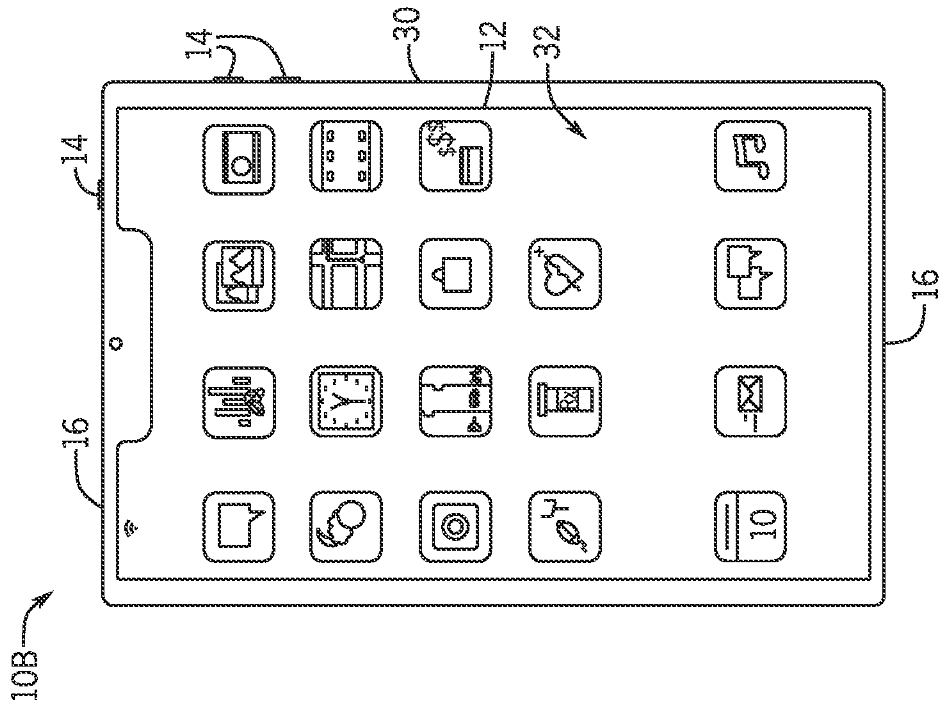
FIG. 3 is an example of the electronic device in the form of a tablet device, in accordance with an embodiment.
Figure 4:
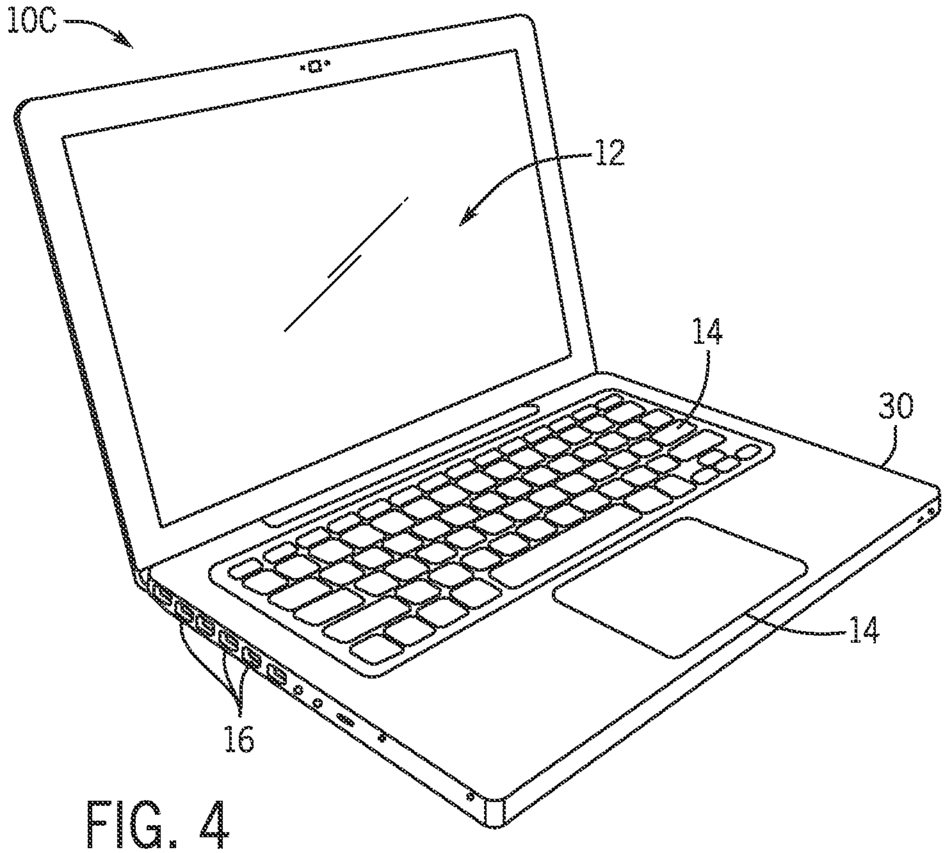
FIG. 4 is an example of the electronic device in the form of a notebook computer, in accordance with an embodiment.
Figure 5:
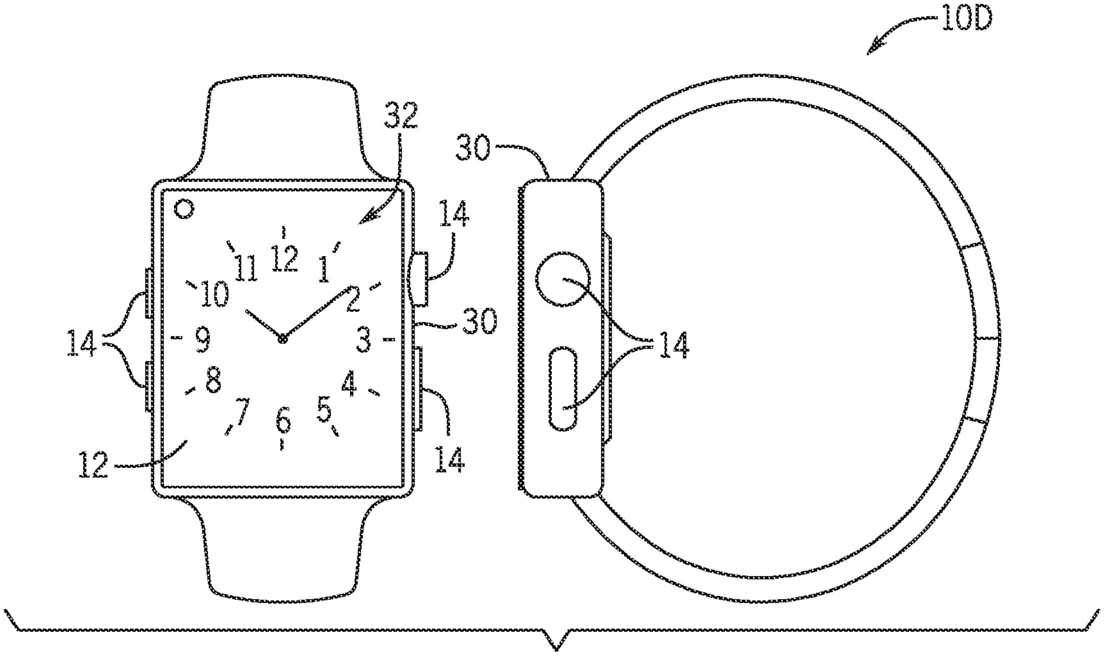
FIG. 5 is an example of the electronic device in the form of a wearable device, in accordance with an embodiment.

The electronic device 10 may take the form of a tablet device 10B, as shown in FIG. 3. FIG. 3 is a front view of the tablet device 10B representing an example of the electronic device 10. By way of example, the tablet device 10B may be any iPad® model available from Apple Inc. A further example of a suitable electronic device 10, specifically a computer 10C, is shown in FIG. 4. FIG. 4 is a front view of the computer 10C representing an example of the electronic device 10. By way of example, the computer 10C may be any MacBook® or iMac® model available from Apple Inc. Another example of a suitable electronic device 10, specifically a watch 10D, is shown in FIG. 5. FIG. 5 are front and side views of the watch 10D representing an example of the electronic device. By way of example, the watch 10D may be any Apple Watch® model available from Apple Inc. As depicted, the tablet device 10B, the computer 10C, and the watch 10D all include respective electronic displays 12, input devices 14, I/O ports 16, and enclosures 30.

Figure 6:
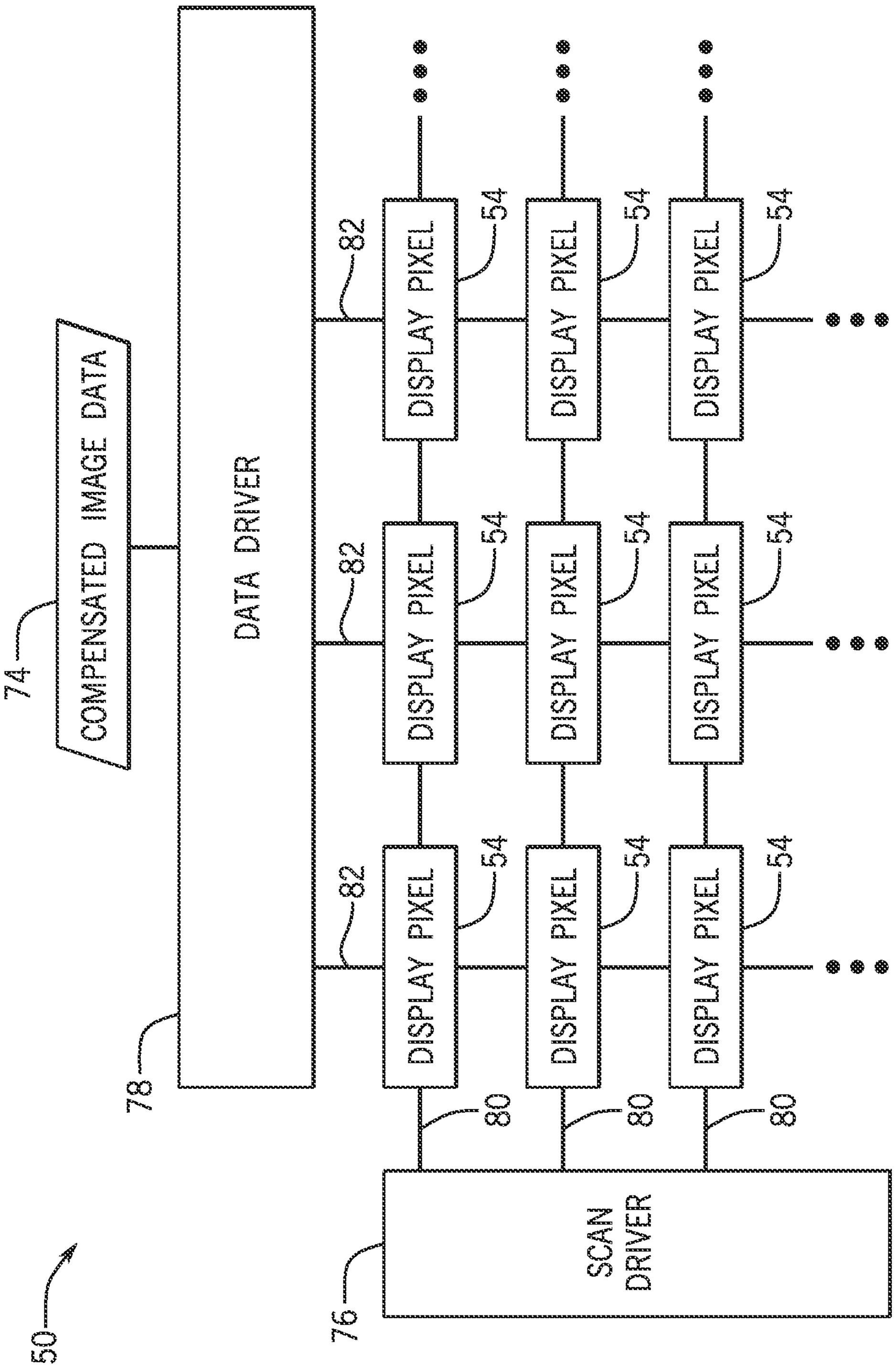
FIG. 6 is a block diagram of the electronic display, in accordance with an embodiment.

Describing now the display pixel array 50, FIG. 6 is a block diagram of the display pixel array 50 of the electronic display 12. It should be understood that, in an actual implementation, additional or fewer components may be included in the display pixel array 50.

The electronic display 12 may receive compensated image data 74 for presentation on the electronic display 12. The electronic display 12 includes display driver circuitry that includes scan driver circuitry 76 and data driver circuitry 78. The display driver circuitry controls programing the compensated image data 74 into the display pixels 54 for presentation of an image frame via light emitted according to each respective bit of compensated image data 74 programmed into one or more of the display pixels 54.

The display pixels 54 may each include one or more self-emissive elements, such as a light-emitting diodes (LEDs) (e.g., organic light emitting diodes (OLEDs) or micro-LEDs (μLEDs)), however other pixels may be used with the systems and methods described herein including but not limited to liquid-crystal devices (LCDs), digital mirror devices (DMD), or the like, and include use of displays that use different driving methods than those described herein, including partial image frame presentation modes, variable refresh rate modes, or the like.

Different display pixels 54 may emit different colors. For example, some of the display pixels 54 may emit red light, some may emit green light, and some may emit blue light. Thus, the display pixels 54 may be driven to emit light at different brightness levels to cause a user viewing the electronic display 12 to perceive an image formed from different colors of light. The display pixels 54 may also correspond to hue and/or luminance levels of a color to be emitted and/or to alternative color combinations, such as combinations that use red (R), green (G), blue (B), or others.

The scan driver circuitry 76 may provide scan signals (e.g., pixel reset, data enable, on-bias stress) on scan lines 80 to control the display pixels 54 by row. For example, the scan driver circuitry 76 may cause a row of the display pixels 54 to become enabled to receive a portion of the compensated image data 74 from data lines 82 from the data driver circuitry 78. In this way, an image frame of the compensated image data 74 may be programmed onto the display pixels 54 row by row. Other examples of the electronic display 12 may program the display pixels 54 in groups other than by row.

Figure 7:
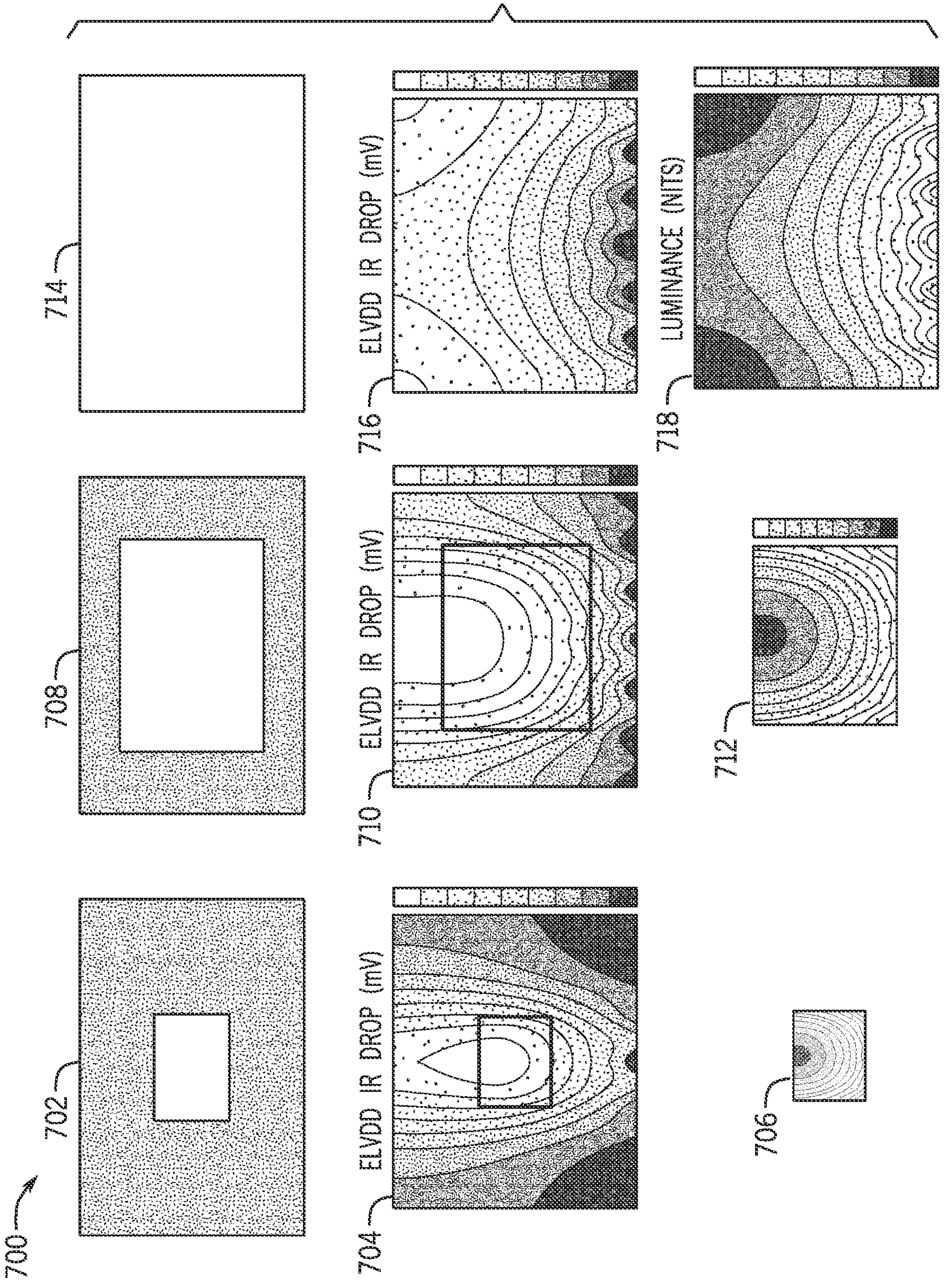
FIG. 7 is a series of plots of voltage (current-resistance (IR)) drop across the electronic display corresponding to different content on the electronic display, in accordance with an embodiment.

FIG. 7 is a diagram 700 of voltage (e.g., ELVDD) drop across and the luminance of the electronic display 12 based on a number of test patterns (e.g., 702, 708, and 714), according to an embodiment of the present disclosure. As previously stated, voltage error (e.g., ELVDD drop and/or ELVSS rise) across the electronic display 12 may vary based on luminance, and as such may vary based on the content displayed on the electronic display 12. The test pattern 702 on the electronic display 12 illustrates a scenario in which a small rectangular portion of the electronic display 12 is illuminated. The voltage drop map 704 illustrates the voltage drop across the electronic display 12 due to the test pattern 702. The lighter colors on the voltage drop maps 704, 710, and 716 represent a larger voltage drop, while the darker colors represent a smaller voltage drop. The luminance map 706 illustrates the luminance of the electronic display 12 due to the test pattern 702. The darker colors on the luminance maps 706, 712, and 718 represent greater luminance and the lighter colors represent lesser luminance. As may be observed from comparing the luminance map 706 and the voltage drop map 704, a greater luminance may correspond to a larger voltage drop, and vice versa. Turning to test pattern 708, it may be observed that the larger illuminated portion of the electronic display 12 has a corresponding increase in luminance (as illustrated by luminance map 712) and a corresponding increase in voltage drop (as illustrated by the voltage drop map 710). Finally, test pattern 714 illustrates a scenario where the electronic display 12 is illuminated. Accordingly, the increased illumination of the electronic display 12 corresponds to a greater luminance illustrated by luminance map 718 and a greater voltage drop illustrated by voltage drop map 716. Although voltage drop (e.g., ELVDD drop) is illustrated as the voltage error in FIG. 7, it should be noted that voltage error may also include voltage rise (e.g., ELVSS rise), as will be discussed further below. As the voltage error across the electronic display 12 varies according to the luminance of the content displayed, among other parameters, one or more compensation schemes may be utilized to adjust image data supplied to one or more pixels to compensate for the varying voltage error.

Figure 8:
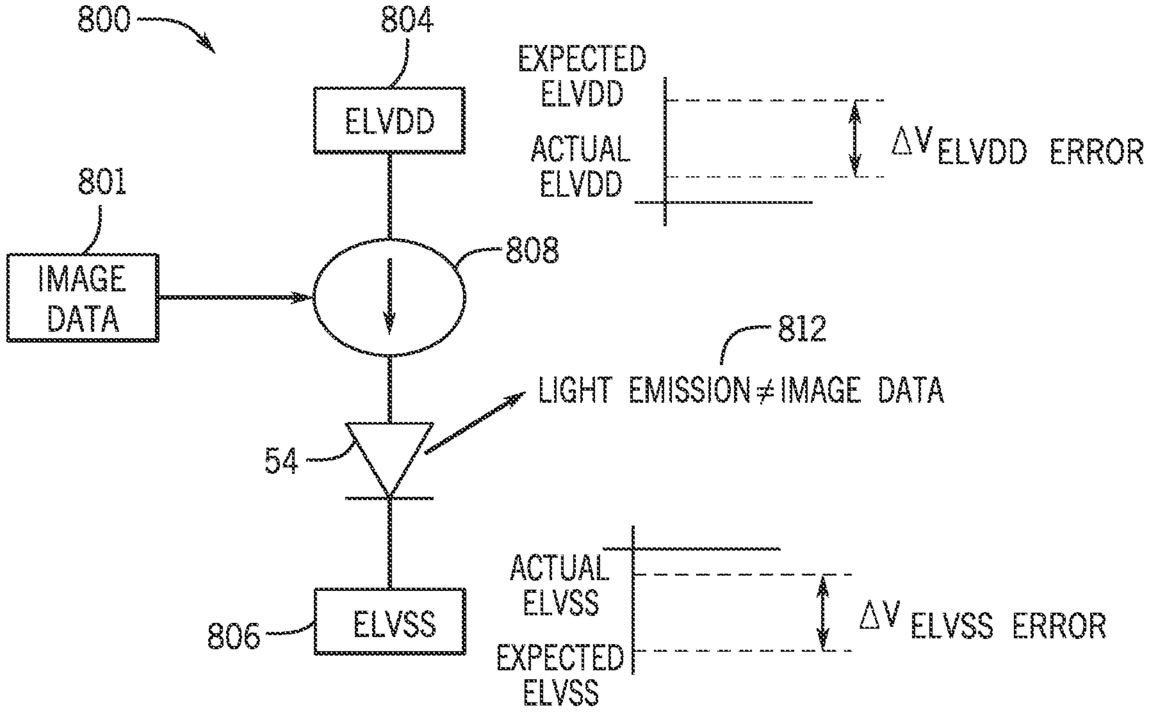
FIG. 8 is a circuit diagram of a display pixel impacted by IR drop across the electronic display, in accordance with an embodiment.

FIG. 8 is a simplified schematic diagram of pixel circuitry 800 of the display pixel 54. The pixel circuitry 800 may include a supply voltage ELVDD 804 and a second supply voltage ELVSS 806 that drive current 808 to the display pixel 54 based on image data 801. As may be seen from the light emission 812, prior to image data compensation, the light emission 812 is not the same as the image data 801 due to the voltage error discussed above.

Figure 9:
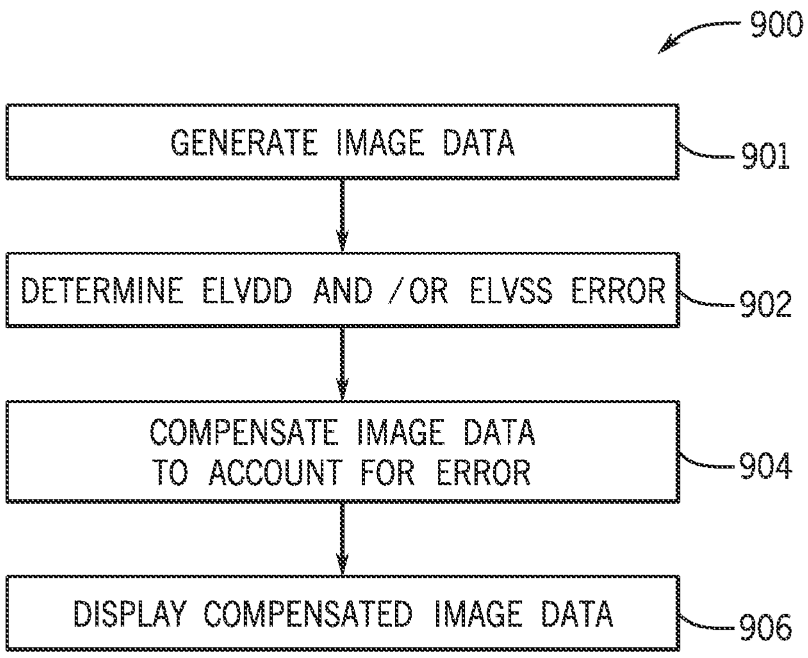
FIG. 9 is a flowchart of a method for compensating and displaying compensated image data, in accordance with an embodiment.
Figure 10:
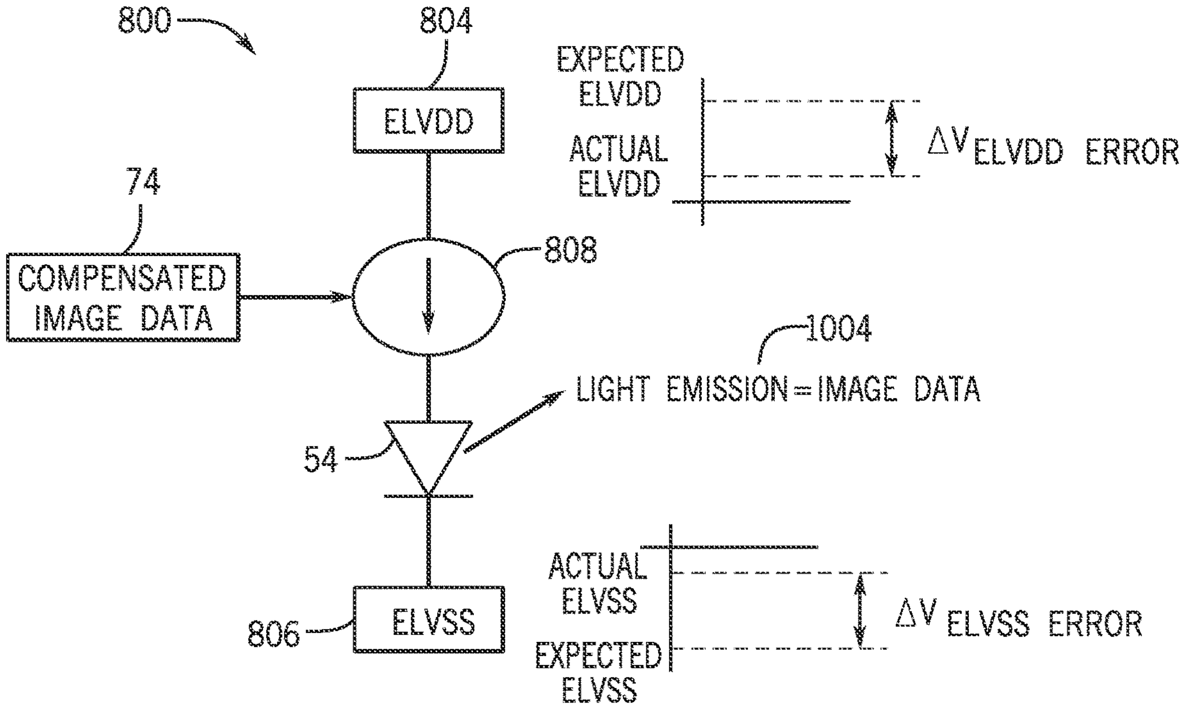
FIG. 10 is the circuit diagram of FIG. 8 after applying the compensated image data of the method of FIG. 9, in accordance with an embodiment.

FIG. 9 is a flowchart of a method 900 for compensating the image data 801 such that the light emission of the display pixel 54 is the same as the image data 801. In process block 901 the pixel circuitry 800 generates image data (e.g., the image data 801). In process block 902, the pixel circuitry and/or compensation schemes determine ELVDD 804 error and/or ELVSS 806 error. In process block 904, the compensation schemes compensate the image data 801 to account for the ELVDD 804 and/or ELVSS 806 error. A variety of compensation schemes may be used. For instance, a digital compensation scheme may digitally compensate the image data (e.g., by adjusting the gray level of the image data to account for the voltage error), while an analog compensation scheme may provide an analog compensation to the image data 801 (e.g., by adjusting the voltage that drives the current 808 to the display pixel 54). In process block 906, the electronic display 12 will display the compensated image data 74. FIG. 10 illustrates the pixel circuitry 800 after the image data 801 has been compensated to generate compensated image data 74. The compensated image data 74 causes the light emission 1004 of the display pixel 54 to be the same as the image data 801.

Figure 11:
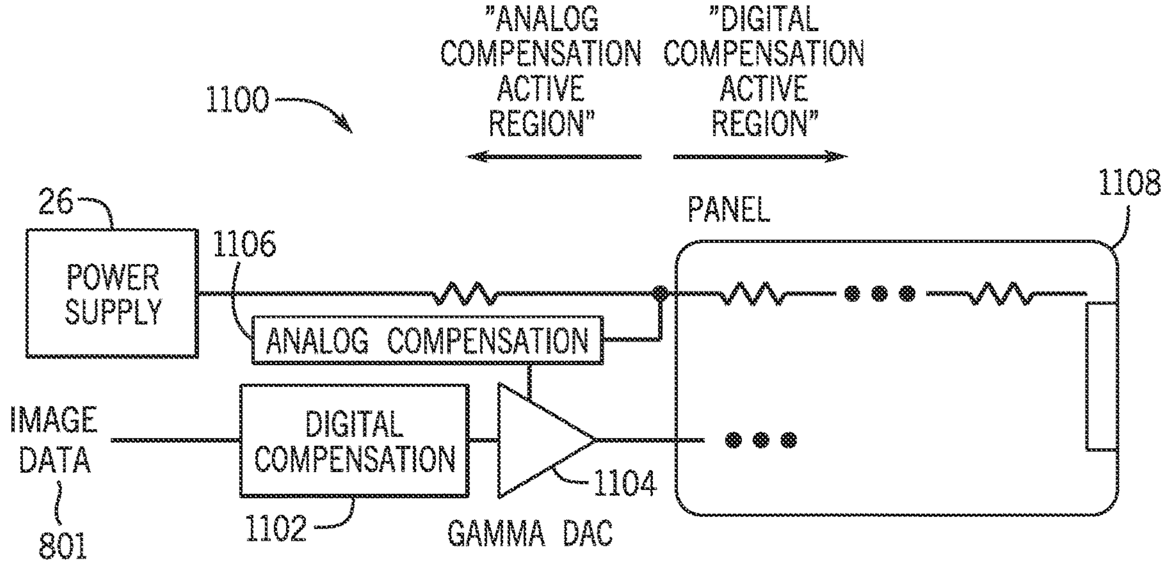
FIG. 11 is a schematic diagram of a circuit implementing a digital compensation scheme and an analog compensation scheme, in accordance with an embodiment.

FIG. 11 is a schematic diagram of compensation circuitry 1100. The compensation circuitry 1100 may provide the digital compensation and/or analog compensation previously discussed. The power supply 26 may provide ELVDD 804 and/or ELVSS 806. The digital compensation scheme 1102 may digitally compensate the image data 801 to generate compensated image data 74. As defined herein, IR is the product of current (I) and resistance (R) and therefore, by Ohm's Law, IR drop or IR error is equivalent to voltage drop or voltage error. digital compensation schemes are pixel-level digital compensation schemes that are performed in a processor (e.g., within the processor core complex 18), are based on the content displayed on the electronic display 12, and may be stored in lookup tables (LUTs). In conjunction with or independent of the digital compensation 1102, the analog compensation 1106 may provide analog compensation for voltage error. The analog compensation 1106 and/or the digital compensation 1102 may determine a compensation required to provide the display pixels 54 of the display panel 1108 with the correct voltage, and may transmit the compensation to a gamma DAC 1104, which may perform the compensation.

Figure 12A:
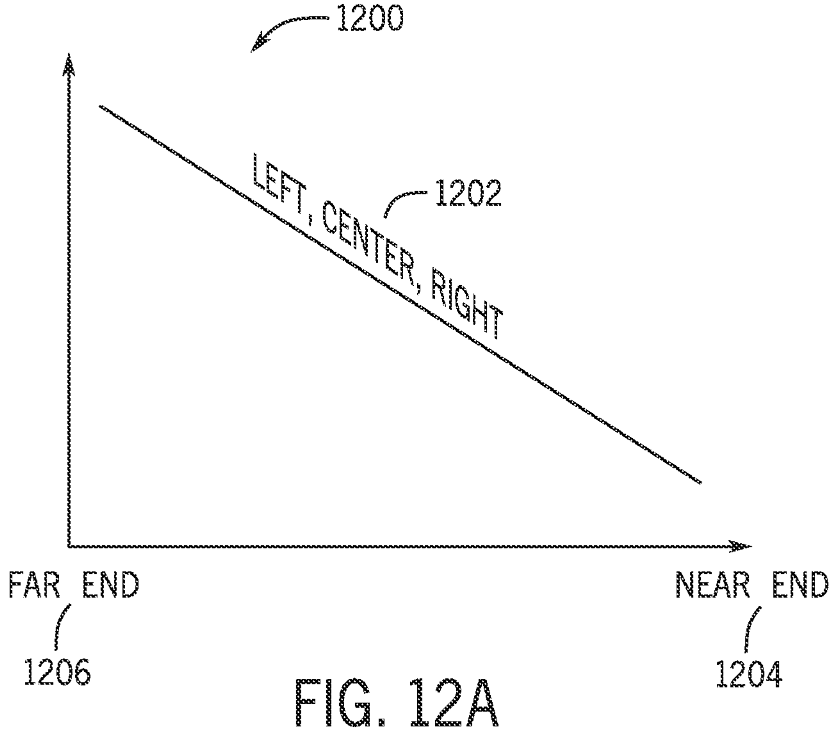
FIG. 12A is a graph representative of a digital compensation implemented by a one-dimensional (1D) digital compensation scheme, in accordance with an embodiment.

A variety of digital compensation schemes such as the digital compensation 1102 may be employed for image data compensation. FIG. 12A is a graph 1200 representative of the digital compensation used by a one-dimensional (1D) digital compensation. A 1D digital compensation may apply a linear compensation represented by slope 1202. The gain of the slope 1202 adjusted according to per-frame average pixel luminance (APL). In the graph 1200, the compensation is based on the distance on the electronic display 12 from the power supply 26 to multiple display pixels 54 on the electronic display 12. As may be seen from the graph 1200, the display pixels 54 on the near end 1204 of the display panel 908 (e.g., the display pixels 54 nearest the power supply 26) receive less digital compensation, and the compensation voltage increases for the display pixels 54 that are positioned further away from the power supply 26, with the greatest compensation voltage being supplied at the far end 1206 of the electronic display 12.

Figure 12B:
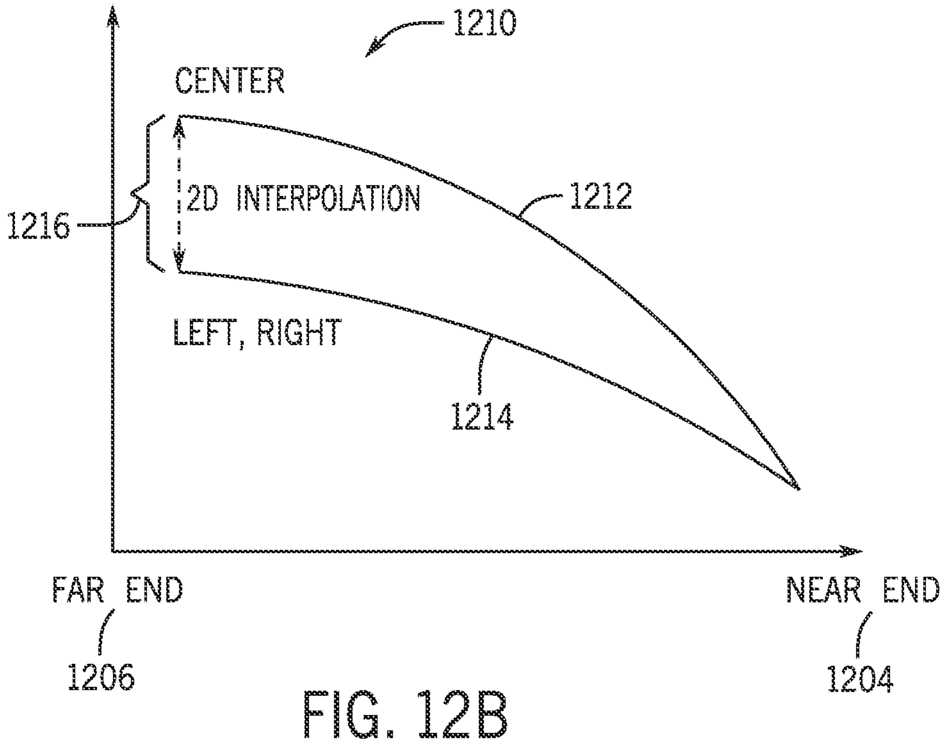
FIG. 12B is a graph of a digital compensation implemented by a two-dimensional (2D) digital compensation scheme, in accordance with an embodiment.

However, as previously discussed, the voltage error across the electronic display 12 may not necessarily be linear. Indeed, the voltage error may depend on multiple parameters, such as the content displayed on the electronic display 12. For example, a higher-luminance portion of the electronic display 12 may correlate to a larger error drop while a lower-luminance portion may correlate to a smaller voltage error. As such, a two-dimensional (2D) compensation scheme may be advantageous. Unlike the 1D digital compensation, a 2D digital compensation may use various parameters to apply a series of local non-linear voltage compensations per-pixel based on the determined voltage error at those discrete areas, in contrast to the single linear voltage compensation described in FIG. 12A. FIG. 12B illustrates a graph 1210 representative of a digital compensation used by a 2D digital compensation. As may be seen from the curve 1212 representing the compensation applied to the center of the electronic display 12 and the curve 1214 representing the compensation applied to the left and right side of the electronic display 12, the compensation is not applied linearly from the near end 1204 to the far end 1204 of the electronic display 12. Instead, the curve 1212 and the curve 1214 may adjust non-linearly to compensate for the voltage error of the display as determined by the 2D interpolation 1216. The systems and methods for performing a 2D digital compensation will be discussed in greater detail below.

Figure 13:
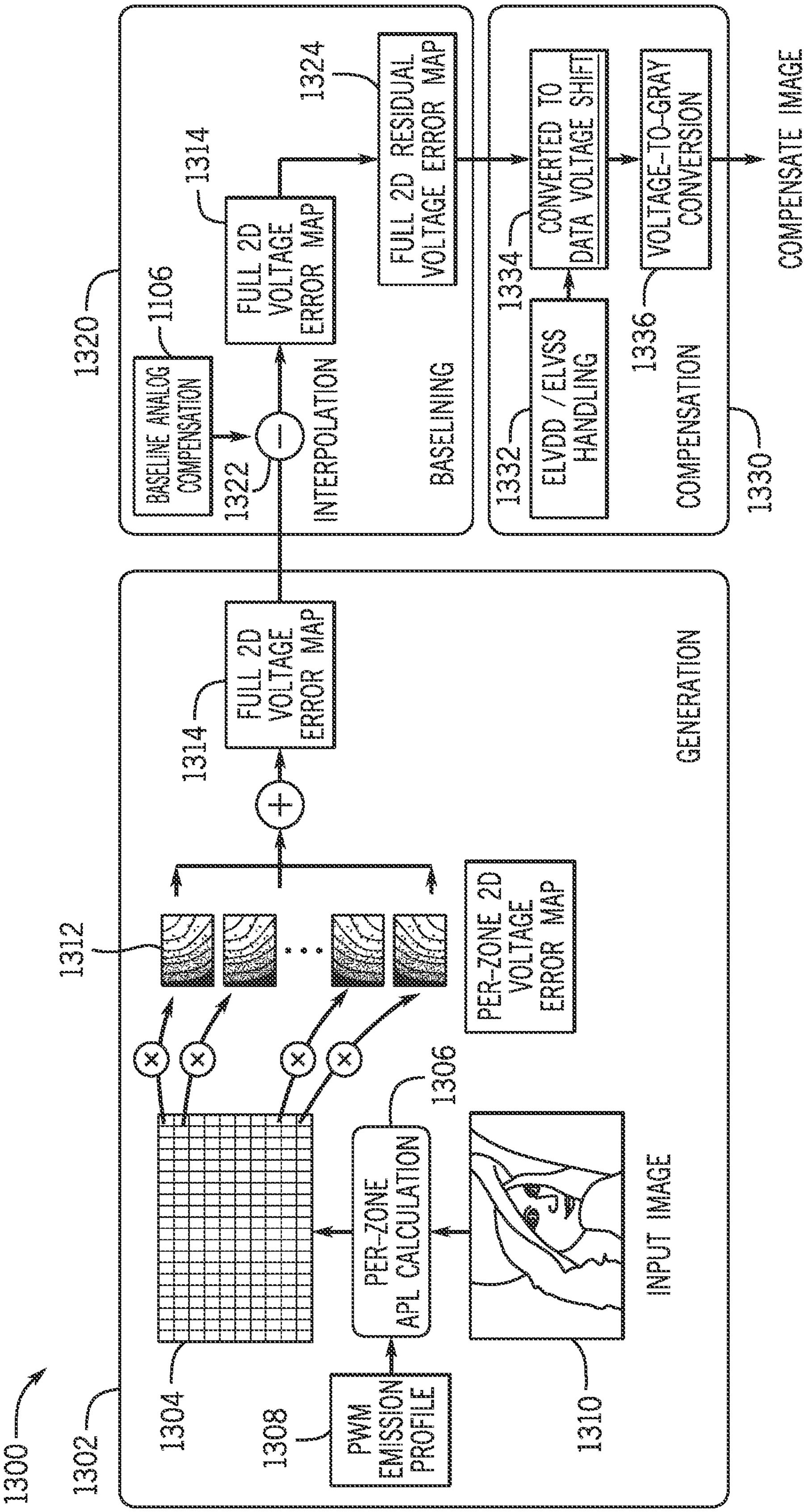
FIG. 13 is a block diagram of a 2D digital compensation 1300, in accordance with an embodiment.

FIG. 13 is a block diagram of a 2D digital compensation 1300. For clarity, the 2D digital compensation 1300 is divided into three parts, a generation block 1302, a baselining block 1320, and a compensation block 1330. The generation block 1302 may include a zone map 1304, a pulse-width modulation (PWM) emission profile 1308, a per-zone voltage error map 1132, and a full 2D voltage error map 1314.

Figure 14:
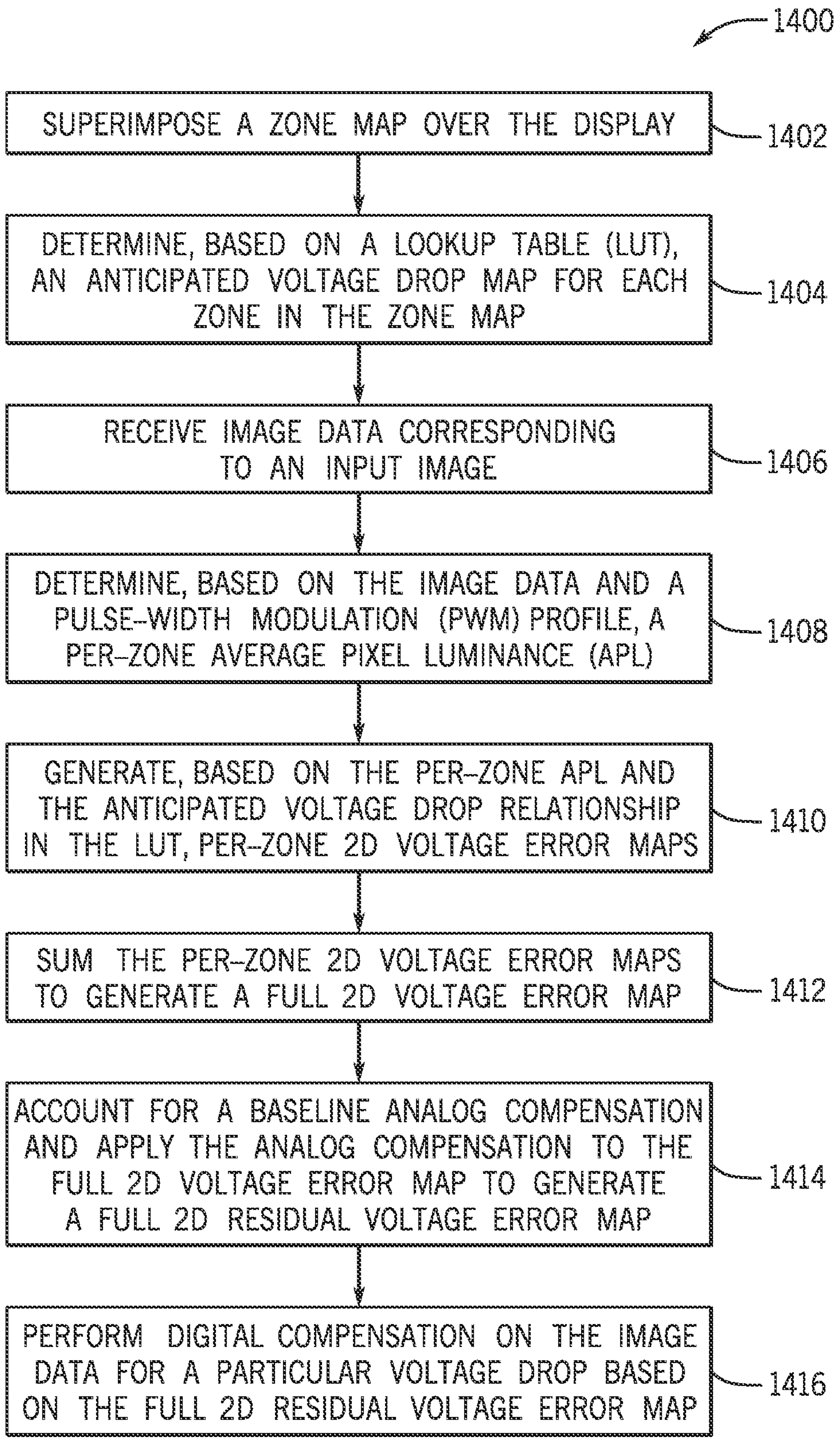
FIG. 14 is a flowchart of a method 1400 for carrying out the 2D digital compensation scheme in FIG. 13, in accordance with an embodiment.

FIG. 14 is a flowchart of a method 1400 for carrying out the 2D digital compensation 1300 illustrated in FIG. 13. In process block 1402, the 2D digital compensation 1300 may superimpose a zone map (e.g., 1304 in FIG. 13) over the electronic display 12. The zone map 1304 may include any appropriate number of zones arranged in rows and columns (e.g., 10×20, 10×10, 20×40, and so on). In some embodiments, the size of the zone map 1304 may be predetermined (e.g., during manufacture-stage calibration). The zone map 1304 may have a corresponding lookup table, each entry of the lookup table may include information regarding the anticipated voltage error relationship that may relate a modeled or empirically determined voltage error corresponding to average pixel luminance and global brightness (e.g., which together may define the amount of current) for each zone of the zone map 1304. The voltage error information may be determined during manufacture-stage calibration, stored in the lookup table, and may be used to determine the size of the zone map 1304.

Figure 15:
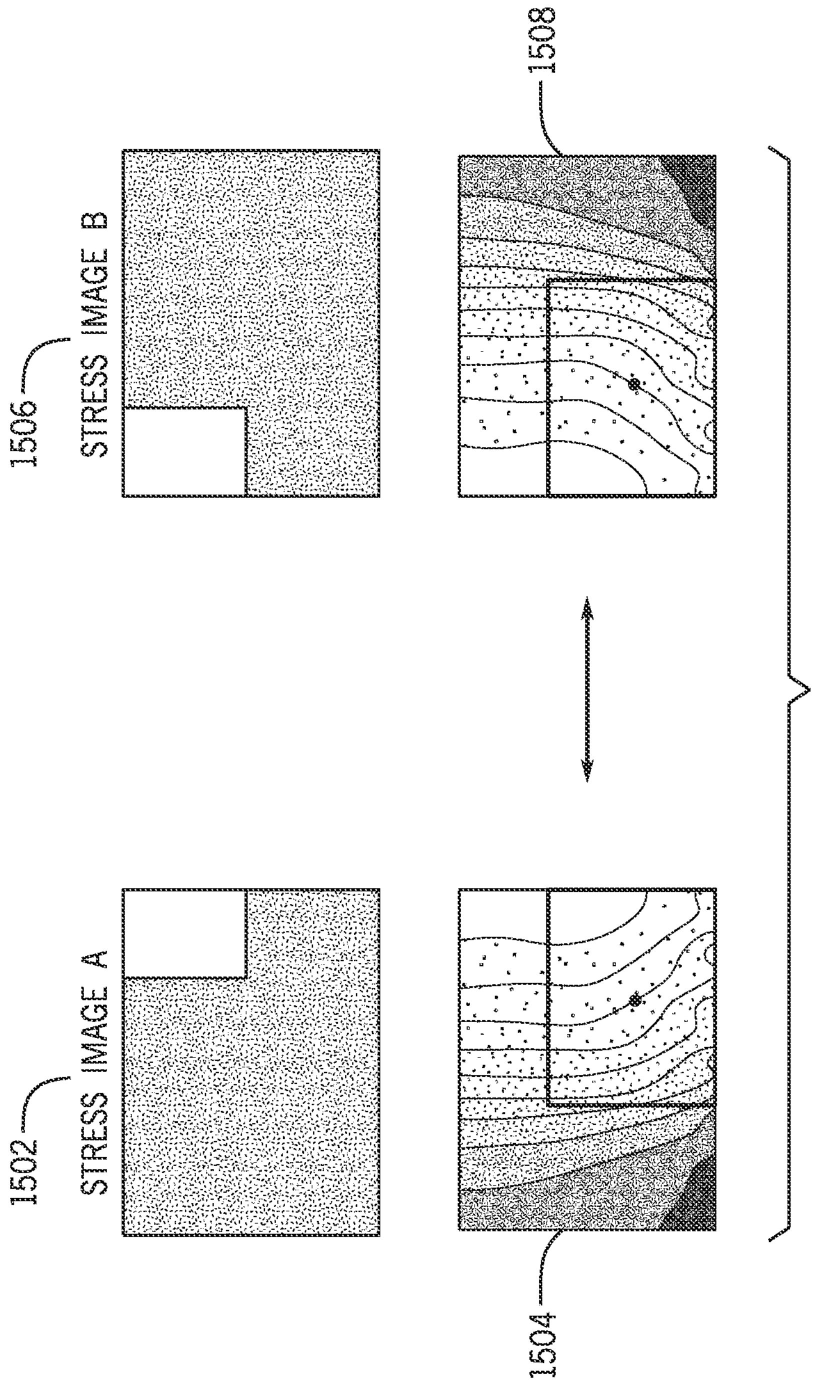
FIG. 15 illustrates symmetrical voltage error maps associated with symmetrical images, in accordance with an embodiment.

Storing the voltage error information may use significant resources in the memory 20. The resource usage in the memory 20 may be reduced by determining that the expected effect of the APL, based at least in part on a two-dimensional (2D) lookup table that relates 2D voltage error and the APL in the various zones of the zone map 1304. If the effect is sufficiently symmetrical, a first half of the two-dimensional lookup table may be stored in memory and a second one-half may be generated based on the first half. FIG. 15 illustrates symmetrical voltage error maps 1504 and 1508 (e.g., that may be stored in a 2D lookup table) associated with symmetrical images 1502 and 1506. For instance, if stress image A 1502 is applied to the electronic display 12, it will produce the voltage error map 1504. Similarly, if stress image B 1506 is symmetrical or nearly symmetrical to the stress image A 1502 and is applied to the electronic display 12, it will produce a voltage error map 1508 that is symmetrical or nearly symmetrical to the voltage error map 1504. Thus, if it is determined that the stress image B 1506 is sufficiently symmetrical (e.g., within a certain symmetry threshold) of the stress image A 1502, only one of the voltage error map 1504 or the voltage error map 1508 may be stored in the memory 20, and the other voltage error may be generated by assuming symmetry. However, if the stress image B 1506 is not within the symmetry threshold of the stress image A 1502, then both the voltage error map 1504 and the voltage error map 1508 will be stored in memory 20, as symmetry may not be assumed.

Figure 16:
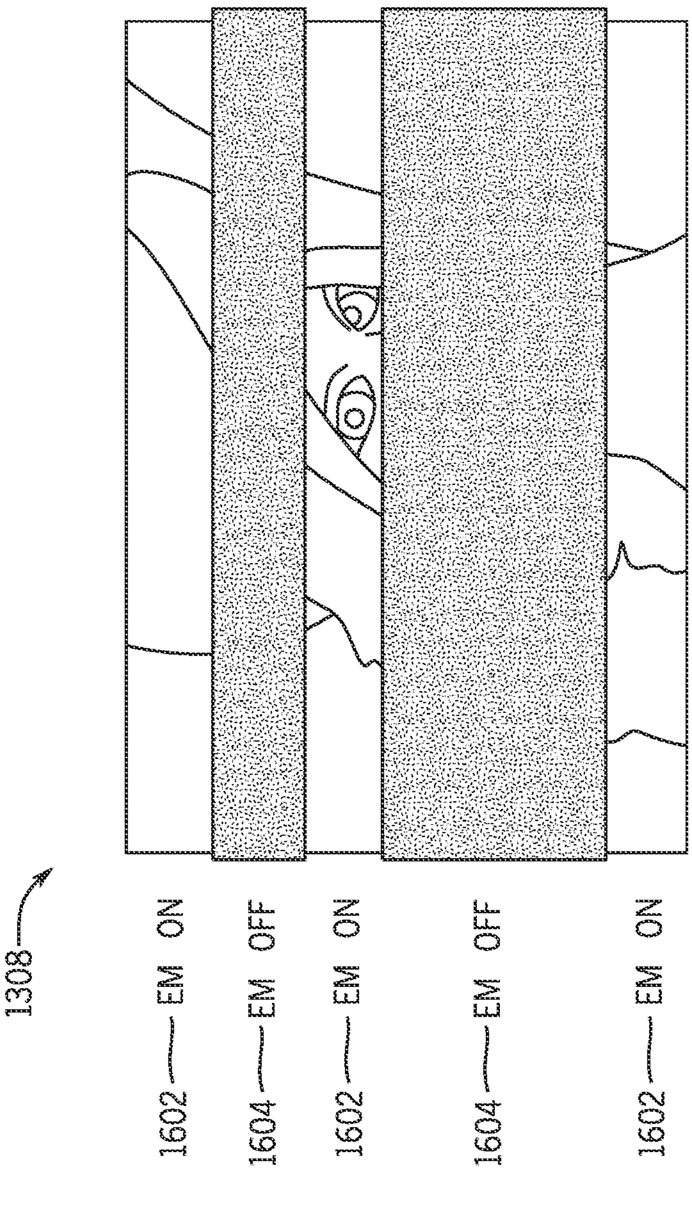
FIG. 16 is an illustration of a PWM emission profile applied to an input image, in accordance with an embodiment.

Briefly returning to FIG. 14, in process block 1404, the 2D digital compensation 1300 may determine an anticipated voltage error map for each zone in the zone map 1304 using the per-zone voltage error information stored in the lookup table. In process block 1406, circuitry carrying out the 2D digital compensation 1300 may receive as input an input image (e.g., input image 1310 in FIG. 13). In process block 1408, the 2D digital compensation 1300 may take as inputs the image data associated with the input image 1310, the PWM emission profile 1308, and/or a global display brightness value, and output a per-zone average pixel luminance (APL) calculation 1306. FIG. 16 is an illustration of the PWM emission profile 1308 as applied to the input image 1310. The PWM emission profile 1308 may include an on/off duty mask at a given time to account for displayed contents on the electronic display 12 that are emitting light. For example, the display pixels 54 within the emission mask (EM) on portions 1602 are emitting light, while the display pixels 54 within the EM off portions 1604 are not emitting light. Thus using the PWM emission profile 1308 as an input may result in a more accurate per-zone APL calculation 1306.

In process block 1410 of FIG. 14, the 2D digital compensation 1300 generates, based on the per-zone APL calculation 1306 and the anticipated per-zone voltage drop relationship information stored in the lookup table of the zone map 1304, a series of anticipated per-zone 2D voltage error maps 1312 corresponding to each zone in the zone map 1304. By applying the per-zone APL calculation 1306 (which may provide a per-zone current magnitude to the zone map 1304) to the anticipated per-zone voltage drop relationship information (which may provide a per-zone resistance magnitude to the zone map 1304), the per-zone 2D voltage error maps 1312 may provide an accurate estimation of the actual voltage error (e.g., ELVDD drop) across each zone of the zone map 1304. In process block 1412, the 2D digital compensation 1300 may sum together the per-zone 2D voltage error maps to generate a full 2D voltage error map 1314. The full 2D voltage error map 1314 may provide fine-grain voltage error information across the electronic display 12.

Briefly returning to FIG. 13, once the full 2D voltage error map 1314 is generated, the 2D digital compensation 1300 may enter the baselining block 1320. In the baselining block 1320, the 2D digital compensation 1300 may apply an interpolation 1322 to the full 2D voltage error map 1314. In process block 1414 of FIG. 14, the 2D digital compensation 1300 may account for an analog compensation (e.g., the analog compensation 1106) that will be (or already has been) performed by the display panel 908. Without accounting for the analog compensation 1106, the 2D digital compensation 1300 may compensate for the same voltage error for which the analog compensation 1106 will compensate, and thus lead to overcompensation and reduced image quality on the electronic display 12. Accounting for the baseline compensation handled by the analog compensation 1106 may reduce the compensation load on the 2D digital compensation 1300 as well as prevent overcompensation. The analog compensation 1106 may be applied linearly across the electronic display 12 (e.g., the analog compensation 1106 may be a global analog compensation) or may be applied locally, as will be discussed in greater detail below in the discussion of FIG. 19 through FIG. 25. While the baseline analog compensation 1106 is illustrated as being subtracted out from the full 2D voltage error map 1314, in some embodiments the 2D digital compensation 1300 may subtract the baseline analog compensation 1106 from the full 2D residual voltage error map 1324. Subtracting the baseline analog compensation 1106 from the full 2D residual voltage error map 1324 may conserve hardware resources, as the full 2D residual voltage error map 1324 may have fewer grid points than the full 2D voltage error map 1314. Once the full 2D residual voltage error map 1324 is generated, the 2D digital compensation 1300 may enter the compensation block 1330. In process block 1416 of FIG. 14, the digital compensation 1300 may, in the compensation block 1330, compensate the image data 801 for a particular voltage drop indicated by the full 2D residual voltage error map 1324.

Figure 17:
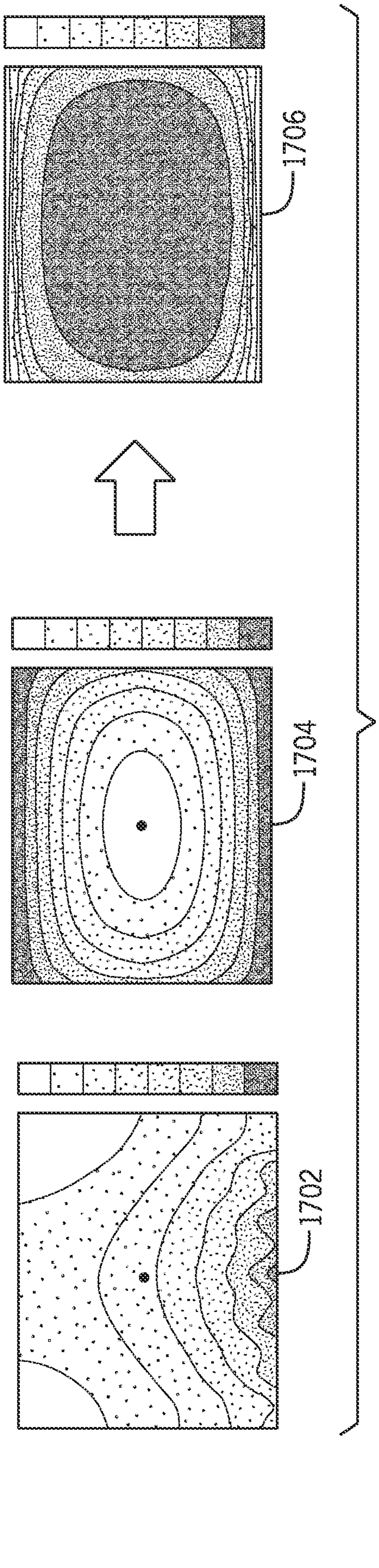
FIG. 17 illustrates an ELVDD drop map, an ELVSS drop map, and an ELVDD-over-ELVSS voltage error map that may result in less memory resource usage, in accordance with an embodiment.

As previously stated, in certain embodiments, a voltage error may be a result of both ELVDD 804 drop and ELVSS 806 rise. To preserve space in the memory 20, the 2D digital compensation 1300 may store a voltage error (i.e., voltage drop) map for the ELVDD 804 or a voltage error (e.g., voltage rise) map for the ELVSS and apply a gain to the stored voltage error map to account for both simultaneously. FIG. 17 illustrates an ELVDD voltage drop map 1702, an ELVSS voltage rise map 1704, and an ELVDD-over-ELVSS voltage error map 1706. In certain embodiments, to account for ELVDD 804 drop and ELVSS 806 rise the 2D digital compensation 1300 may store voltage drop maps associated with the ELVDD 804 and voltage rise maps associated with ELVSS 806. However, it may be appreciated that this would consume more memory than storing only one set of voltage error maps. In certain embodiments, the 2D digital compensation 1300 may store only the maps for ELVDD 804 or ELVSS 806, and multiply the stored map by a certain 2D gain map to account for the other. For example, in FIG. 17, instead of storing both the ELVDD voltage drop map 1702 and the ELVSS voltage rise map 1704, the 2D digital compensation 1300 may only store the ELVDD-over-ELVSS voltage error map 1706, where the ELVDD-over-ELVSS voltage error map 1706 is generated by multiplying the ELVDD voltage drop map 1702 with a 2D gain to account for the ELVSS rise indicated by the ELVSS voltage rise map 1704. By storing only one voltage error map (e.g., the ELVDD voltage drop map 1702) the ELVDD 804 and ELVSS 806 may be handled together while reducing storage consumed in memory 20 and computation load. Returning to the compensation block 1330 of FIG. 13, the 2D digital compensation 1300 will convert the full 2D residual voltage error map 1324 to a data voltage shift in block 1334 and incorporate the ELVDD/ELVSS handling 1332 (i.e., the combined ELVDD 804/ELVSS 806 handling described above). In block 1336, the 2D digital compensation 1300 may convert the data voltage to a corresponding gray level to produce the compensated image 1338.

Figure 18:
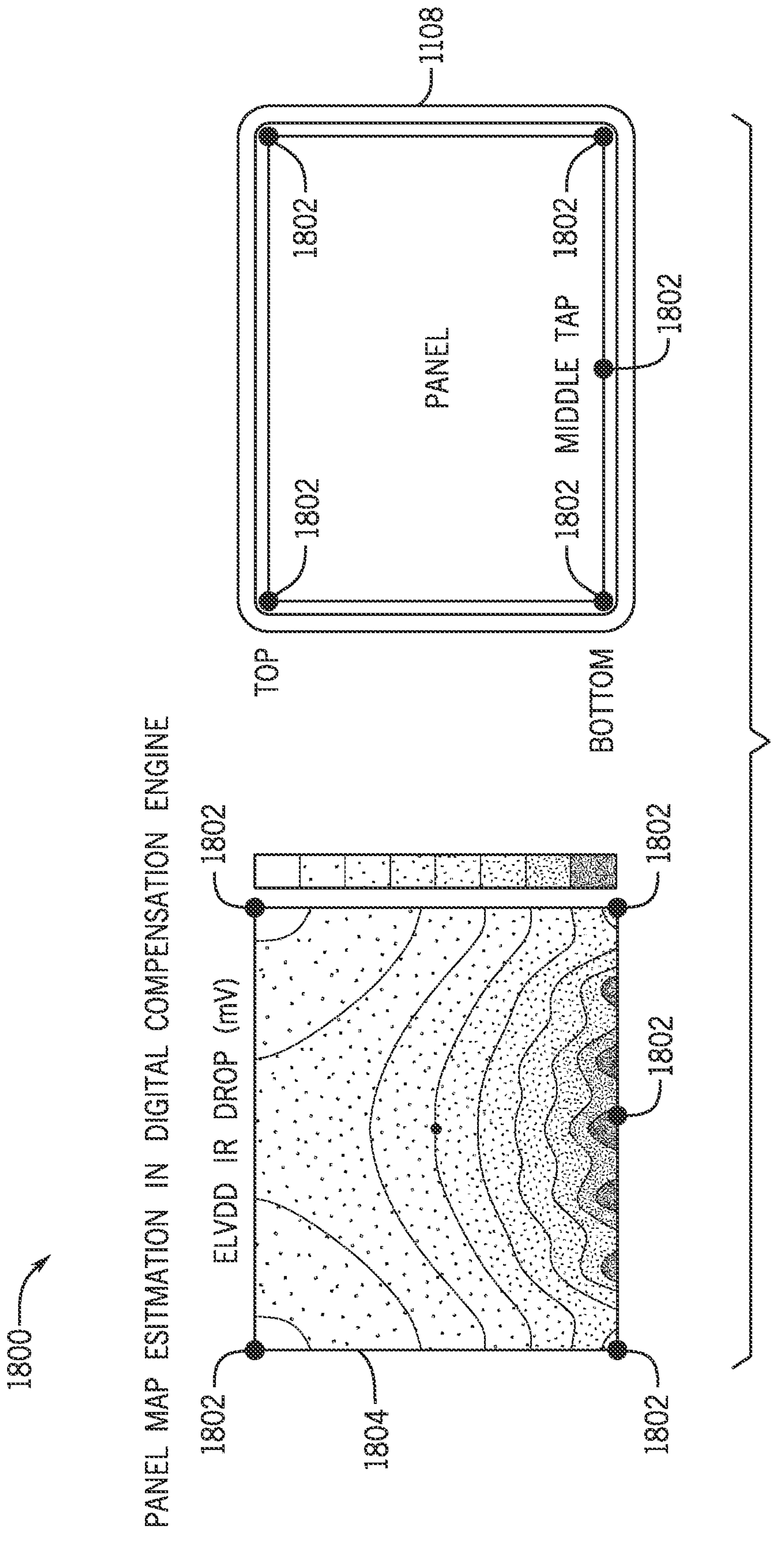
FIG. 18 is a diagram illustrating a display panel having multiple local ELVDD sensing taps around a periphery of the display panel, in accordance with an embodiment.

FIG. 18 is a diagram 1800 illustrating a display panel having multiple local ELVDD sensing taps around the periphery of the display panel, according to an embodiment of the present disclosure. The ELVDD sensing taps 1802 may enable the display panel 1108 to electrically self-calibrate a 2D voltage error map (e.g., the full 2D voltage error map 1314 or the full 2D residual voltage error map 1324) to account for part-to-part variations in voltage error. One of the ELVDD sensing taps 1802 may be placed at each corner of the display panel 1108, and one of the ELVDD sensing taps 1802 may be placed at the center of the display panel 1108 along the bottom edge of the display panel 1108. The ELVDD sensing taps 1802 may sense voltage at the location of the ELVDD sensing taps 1802 on the display panel 1108, and one or more column-driver integrated circuits (CDICs) disposed on the display panel 1108 may read the tap voltage level and, via one or more analog-to-digital converters (ADCs) may convert the voltage levels sensed at the ELVDD sensing taps 1802 to a digital signal. The CDICs may feed the tap voltage levels (as digital signals) back to an digital compensation engine (e.g., the engine running the 2D digital compensation 1300). Using the digital tap voltage level feedback, the digital compensation engine may calibrate a voltage drop map (e.g., the voltage drop map 1804) to handle per-panel calibration. Therefore, using the ELVDD sensing taps 1802, one or more CDICs, and one or more ADCs, the display panel 1108 may electrically self-calibrate to account for part-to-part voltage error variation. While the ELVDD sensing taps 1802 are illustrated in a certain configuration in FIG. 18 (e.g., one at each corner and one in the center of the display panel 1108 along the bottom edge), it should be noted that the ELVDD sensing taps 1802 may be placed at any one or more points on the display panel 1108.

Figure 19:
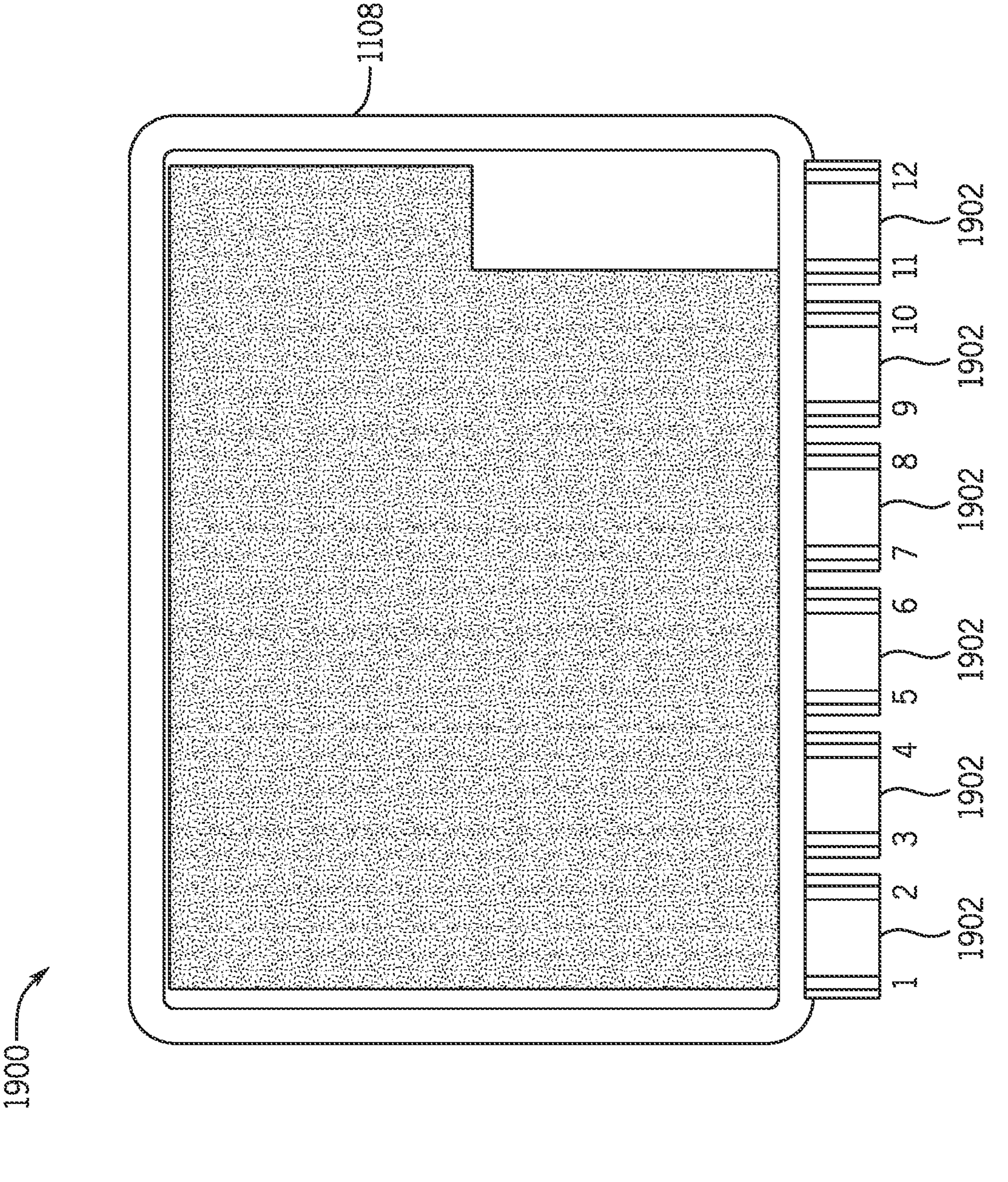
FIG. 19 is a diagram of a series of column-driver integrated circuits (CDICs) coupled to a display panel, wherein the CDICs may sense the voltages of columns of pixels to effectuate an analog compensation, in accordance with an embodiment.

FIG. 19 is a diagram 1900 of a series of CDICs 1902 coupled to a display panel (e.g., 1108), wherein the CDICs 1902 sense the voltages of columns of pixels to effectuate an analog compensation, according to an embodiment of the present disclosure. The CDICs 1902 may detect voltage error at columns of pixels in the display panel 1108 corresponding to each end of each CDIC 1902.

Figure 20:
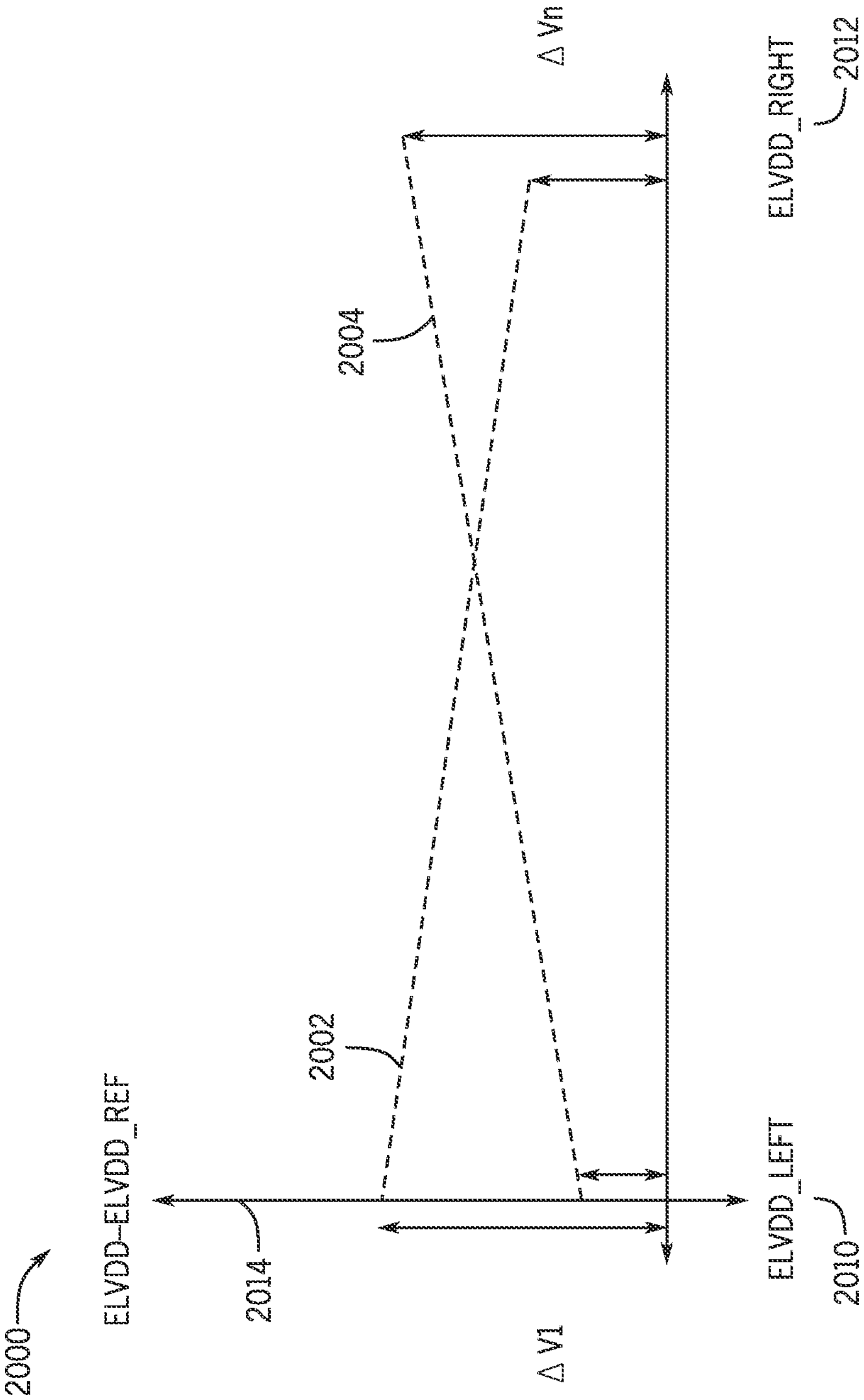
FIG. 20 is a graph illustrating a voltage error and a voltage error compensation applied across a bottom edge of a display panel, in accordance with an embodiment.

FIG. 20 is a graph 2000 illustrating the voltage error and voltage error compensation applied across a bottom edge of a display panel (e.g., 1108), according to an embodiment of the present disclosure. The X-axis of the graph 2000 represents the voltage (e.g., ELVDD) sensed from the left side of the display panel 1108 (e.g., ELVDD left 2010) to the right side of the display panel 1108 (e.g., ELVDD right 2012). The Y-axis 2014 represents the difference between the sensed voltage (ELVDD) and a reference voltage. The change in ELVDD across the display panel 1108 illustrates the voltage drop 2002 that may occur across the display panel 1108 from ELVDD left 2010 to ELVDD right 2012. The voltage drop compensation 2004 may be applied across the display panel 1108 to account for the voltage drop 2002.

Figure 21:
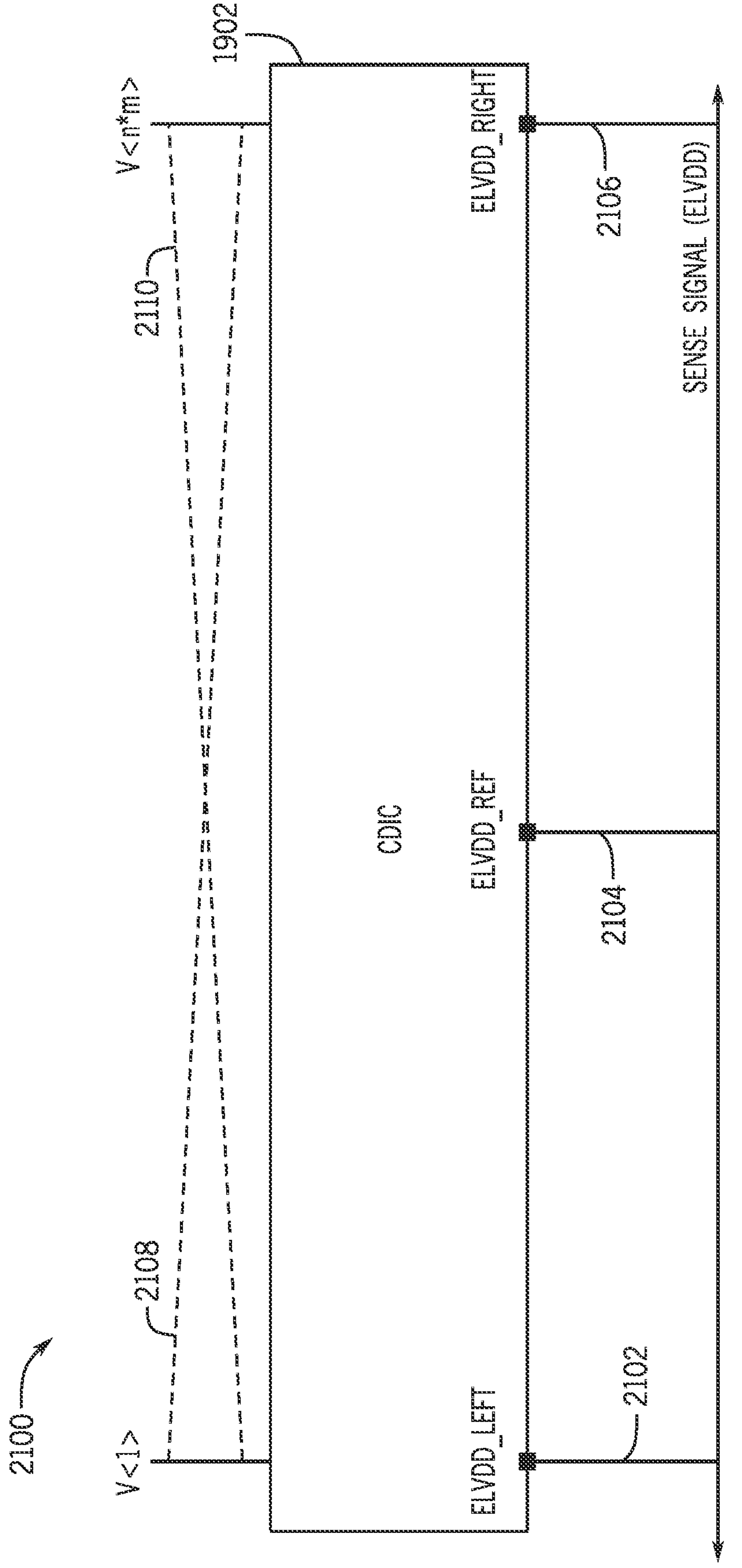
FIG. 21 is a diagram illustrating the voltage drop and voltage drop compensation across a CDIC, in accordance with an embodiment.

FIG. 21 is a diagram 2100 illustrating the voltage drop and voltage drop compensation across a CDIC (e.g., 1902), according to an embodiment of the present disclosure. ELVDD left 2102 may be determined by sensing the voltage across a column of pixels on the left side of the CDIC 1902, ELVDD reference 2104 may be determined by sensing the voltage across a column of pixels at the center of the CDIC 1902, and ELVDD right 2106 may be determined by sensing the voltage across a column of pixels on the right side of the CDIC 1902. ELVDD reference 2104 may represent the expected voltage across the CDIC 1902. Voltage drop 2108 is determined based on the voltages sensed at ELVDD left 2102, ELVDD reference 2104, and ELVDD right 2106. The voltage drop compensation 2110 may be applied by a local analog compensation to compensate for the voltage drop across the CDIC 1902. The voltage drop compensation 2110 may be provided by offsetting or otherwise compensating the image data 801 at an output channel of the CDIC 1902, and may include a digital compensation or an analog compensation. By determining the voltage drop 2108 across one or more CDICs 1902 rather than across the entire display panel 1108, the local analog compensation may be able to more accurately compensate for voltage error. While only one CDIC 1902 is shown in FIG. 21, it should be noted that the local analog compensation may sense the voltage drop 2108 and apply the voltage drop compensation 2110 across more than one CDIC 1902 (e.g., the local analog compensation may apply the voltage drop compensation 2110 to all or some of the CDICs 1902 in FIG. 19).

Figure 22:
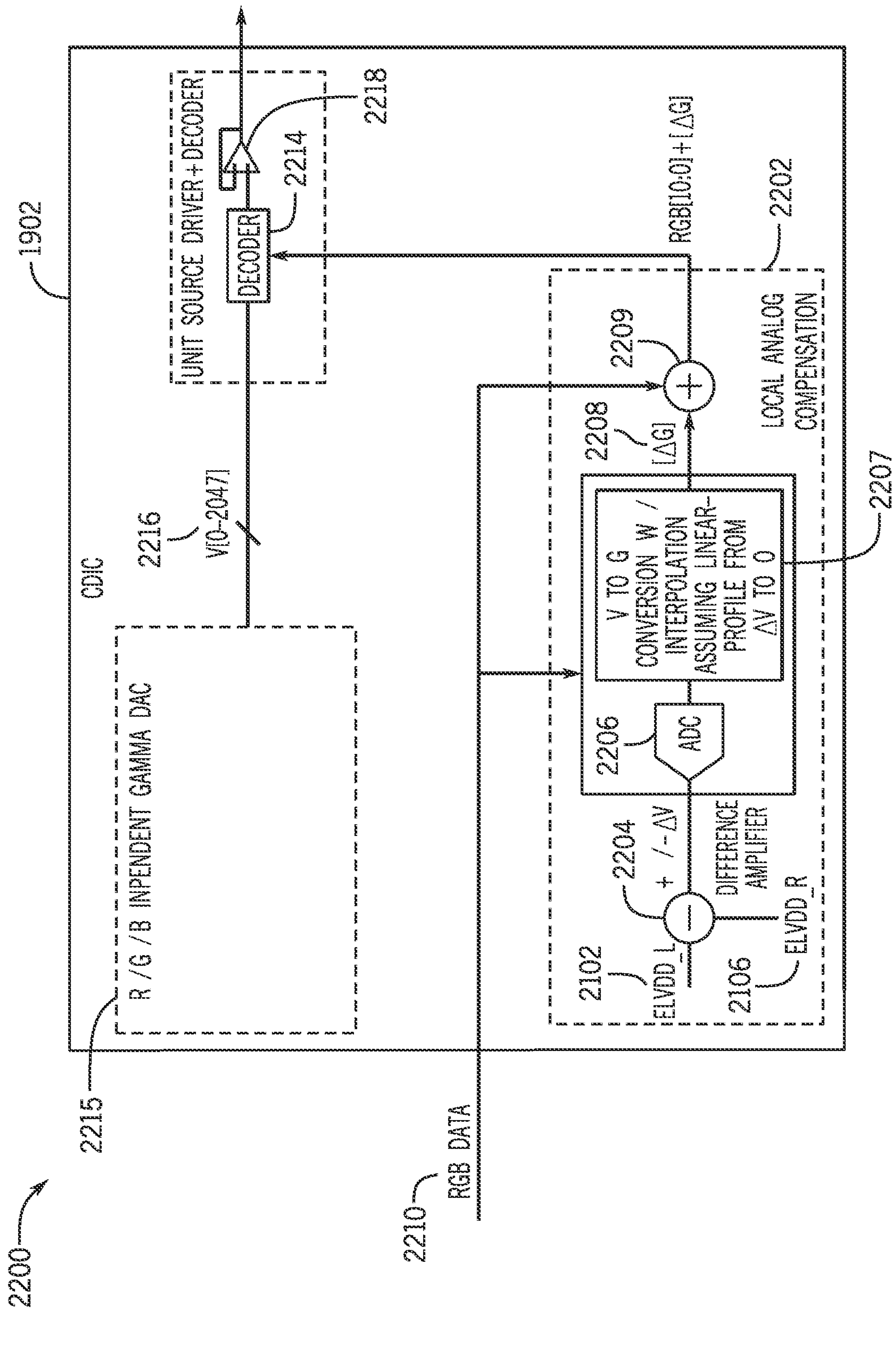
FIG. 22 is a schematic diagram of a circuit including an implementation of a digital local analog compensation in a CDIC, in accordance with an embodiment.

FIG. 22 is a schematic diagram of a circuit 2200 including an implementation of a digital local analog compensation in a CDIC (e.g., 1902), according to an embodiment of the present disclosure. The circuit 2200 includes a local analog compensation 2202 that may handle the digital compensation in the CDIC 1902. The local analog compensation 2202 may take in the ELVDD left 2102 and the ELVDD right 2106 (e.g., as previously seen in FIG. 21) as inputs to a difference amplifier 2204. The difference amplifier 2204 may output the difference between ELVDD right 2106 and ELVDD left 2102 in order to determine a voltage difference (e.g., the gradient of the voltage drop 2108 across the CDIC 1902 in FIG. 21). The local analog compensation 2202 may input the voltage drop 2108 to an analog-to-digital converter (ADC) 2206. The ADC 2206 may convert the analog signal representing the voltage difference to a digital signal. In block 2207, the local analog compensation 2202 may convert the digital voltage signal to a gray level value and apply an interpolation assuming a linear profile from the voltage difference to a gray level of 0, generating a gray level difference 2208 corresponding to the voltage difference. The gray level difference 2208 may then be combined with the RGB data 2210 to produce a compensated gray level. An R/G/B independent gamma DAC 2215 may generate a number of potential compensation voltages 2216 to a decoder 2214. The decoder 2214 may select which of the potential compensation voltages 2216 to output to the unit source driver 2218 based on the compensated gray level.

The unit source driver 2218 may output to the display panel 1108 a compensation voltage of the potential compensation voltages 2216 to compensate for the voltage error across the display panel 1108. While it is shown in the local analog compensation 2202 that the gray level difference 2208 is added to the RGB data 2210, it should be noted that in some embodiments the gray level difference 2208 may be subtracted from the RGB data 2210.

Figure 23:
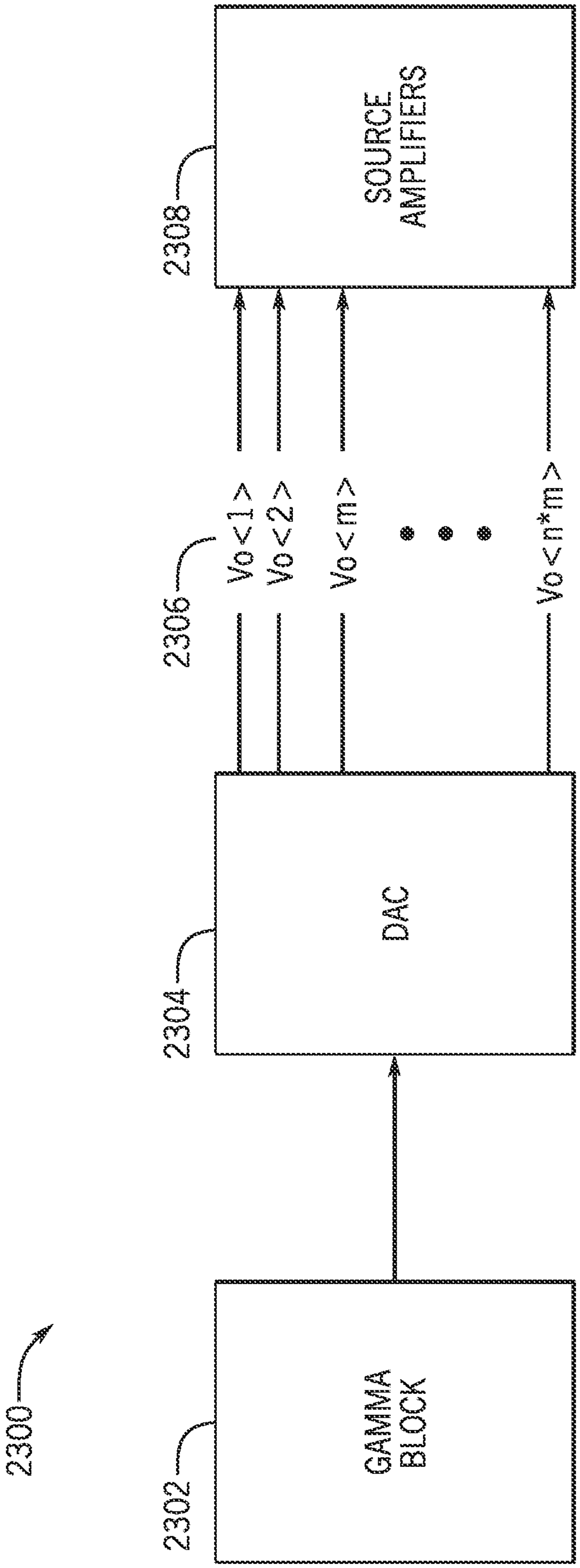
FIG. 23 is a simplified block diagram of a circuit including an implementation of an analog local analog compensation in a CDIC, in accordance with an embodiment.

FIG. 23 is a simplified block diagram of a circuit 2300 including an implementation of an analog local analog compensation in a CDIC (e.g., 1902), according to an embodiment of the present disclosure. The circuit 2300 may include a gamma block 2302, a DAC 2304, a series of voltages 2306, and source amplifiers 2308. The DAC 2304 may take digital compensation data from the gamma block 2302, convert the digital compensation data into the series of voltages 2306, and output one or more voltages of the series of voltages 2306 to the source amplifier 2308.

FIG. 24 is a schematic diagram of a circuit 2400 that is a detailed version of the circuit 2300 in FIG. 23. The circuit 2400 may take in ELVDD left 2102 and ELVDD reference 2104 as inputs to a difference amplifier 2402 and may take in ELVDD right 2106 and ELVDD reference 2104 as inputs to a difference amplifier 2404 to generate voltage differences (e.g., the voltage differences representing voltage error across the CDICs 1902). The difference amplifier 2402 and the difference amplifier 2404 may output the voltage differences to a voltage ladder 2406 to generate the series of voltages 2306. Each voltage of the series of voltages 2306 are output to a voltage-to-current converter 2408 to produce a series of currents 2410. Each respective current of the series of currents 2410 is passed to a respective source amplifier 2308. A current of the series of currents 2410, when passed to the source amplifiers 2308, may pass through a feedback resistor 2412 of the source amplifier 2308. The current, when passed through the feedback resistor 2412 may generate a voltage that may provide an analog compensation to the pixels in the display panel 1108.

Figure 25A:
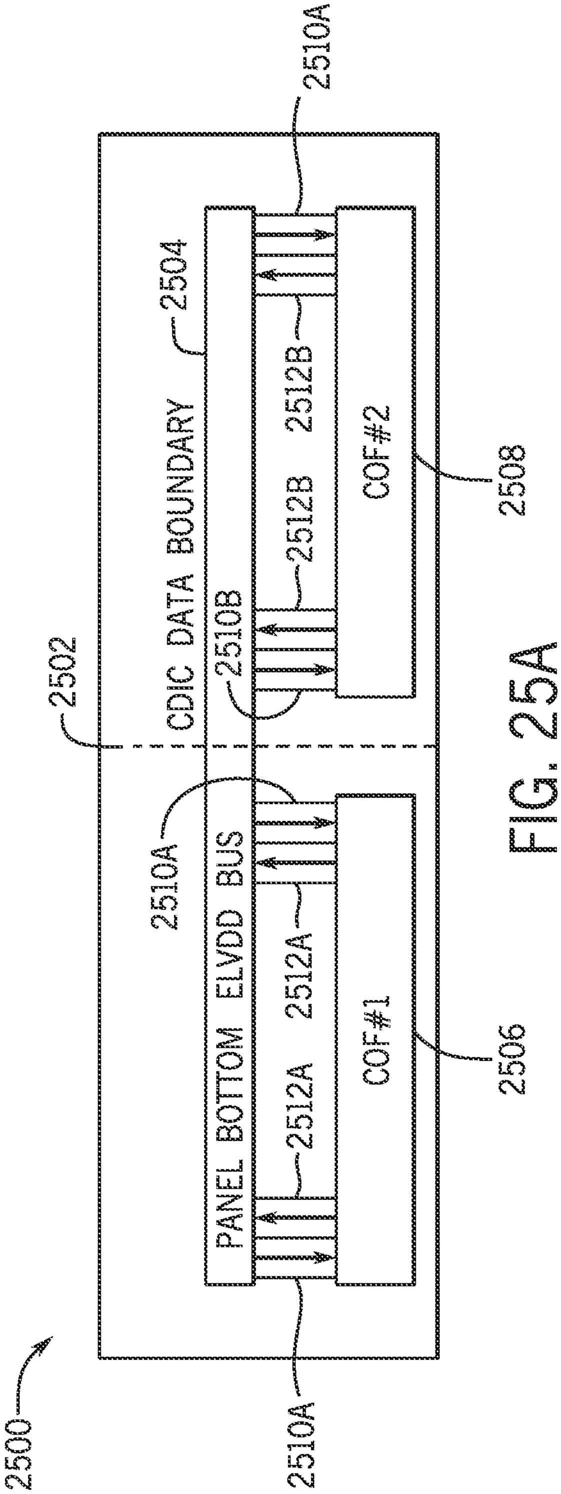
FIG. 25A is an example of placement of voltage sensing taps on an electronic display, in accordance with an embodiment.

FIG. 25A is a block diagram 2500 illustrating an example placement pattern of voltage sensing taps on an electronic display (e.g., 12). The block diagram 2500 (e.g., a CDIC 1902) may include a bus 2504 communicatively coupled to the bottom of the display panel 1108. The bus 2504 may be communicatively coupled to a chip on flex (COF) 2506 via ELVDD inputs 2512A and voltage taps 2510A; and may be communicatively coupled to a COF 2508 via ELVDD inputs 2512B and voltage taps 2510B. While the CDIC data boundary 2502 is illustrated as being evenly between the COF 2506 and the COF 2508, the CDIC data boundary 2502 may be skewed toward either the COF 2506 or the COF 2508. If the voltage taps 2510 are not an equal distance away from the CDIC data boundary 2502, there may be a resulting interpolation error in the voltage sensed at the voltage taps 2510.

Figure 25B:
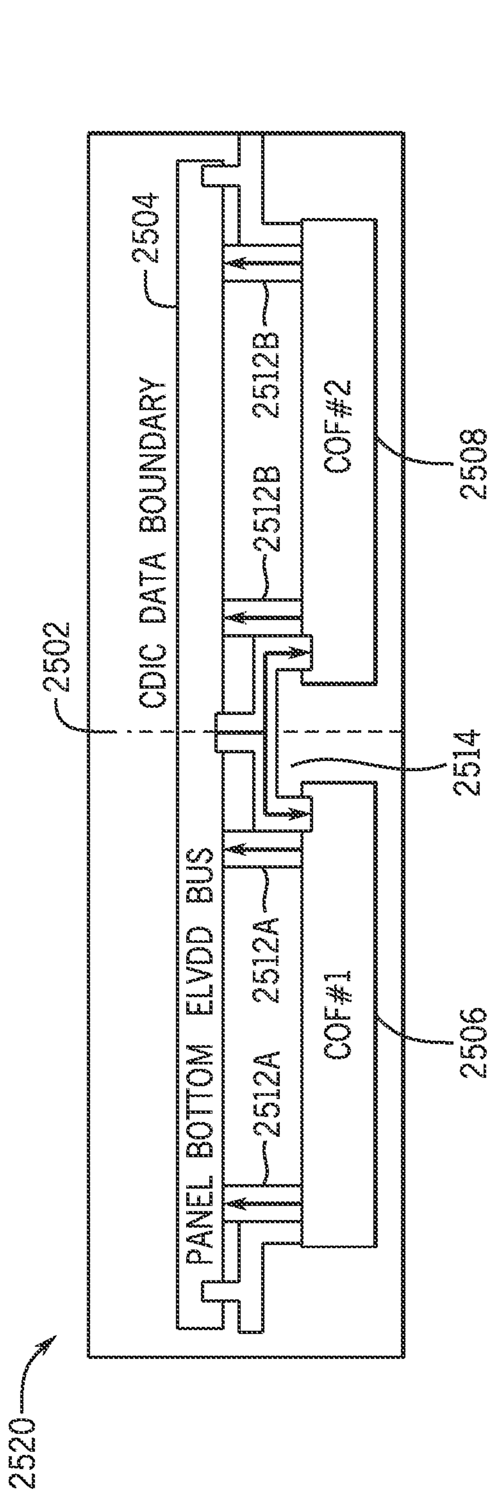
FIG. 25B is a block diagram illustrating placement of voltage sensing taps on an electronic display in accordance with an embodiment.

FIG. 25B is a block diagram 2520 illustrating placement of voltage sensing taps on an electronic display (e.g., 12), according to an embodiment of the present disclosure. As may be seen in FIG. 25B, the bus 2504 is communicatively coupled to the COF 2506 and the COF 2508 by a single voltage tap 2514. The voltage tap 2514 ensures that the voltage sensed at COF 2506 and COF 2508 is the same, and thus mitigates or removes the interpolation error produced as a result of the configuration in FIG. 25A.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A pixel voltage compensation method, comprising:

determining a two-dimensional voltage error map of voltage supplied to display pixels of an electronic display based at least in part on image data to be displayed on the electronic display;

subtracting a baseline voltage error that is to be corrected using an analog voltage compensation in the electronic display, wherein the baseline voltage error is subtracted from the two-dimensional voltage error map to obtain a residual two-dimensional voltage error map;

adjusting the image data digitally to compensate for voltage error represented by the residual two-dimensional voltage error map to obtain compensated image data; and displaying the compensated image data on the electronic display while correcting for the baseline voltage error in the electronic display using the analog voltage compensation.

2. The pixel voltage compensation method of claim 1, wherein determining the two-dimensional voltage error map comprises:

determining an expected average pixel luminance of the display pixels;

determining, via a plurality of lookup tables, an expected per-zone voltage error across the electronic display; and determining a plurality of per-zone voltage error maps based on the expected average pixel luminance, the expected per-zone voltage error, or both.

3. The pixel voltage compensation method of claim 2, wherein the expected average pixel luminance is determined based on the image data, a global display brightness value setting, or both.

4. The pixel voltage compensation method of claim 2, wherein the expected average pixel luminance is determined based at least in part on an emission profile of the electronic display.

5. The pixel voltage compensation method of claim 1, wherein the two-dimensional voltage error map corresponds to a positive voltage supply drop or a negative voltage supply rise, or a combination thereof.

6. The pixel voltage compensation method of claim 1, wherein the analog voltage compensation comprises a global voltage error correction.

7. The pixel voltage compensation method of claim 1, wherein the analog voltage compensation comprises a local voltage error correction that varies in at least one dimension.

8. The pixel voltage compensation method of claim 1, wherein the image data is adjusted in processing circuitry separate from display driver circuitry of the electronic display.

9. An electronic display, comprising:

a display panel comprising a plurality of pixels;

a plurality of column-driver integrated circuits (CDICs) coupled to the display panel, wherein a first CDIC of the plurality of CDICs is configured to determine a first supply voltage at a first location corresponding to a first column of the display panel, and to determine a second supply voltage at a second location corresponding to a second column of the display panel different than the first column; and compensation circuitry configured to:

determine a voltage error gradient between a first voltage error at the first location on the display panel and a second voltage error at the second location on the display panel; and apply a compensation to the plurality of pixels based on their respective positions between the first location and the second location to compensate for the voltage error gradient.

10. The electronic display of claim 9, wherein the compensation circuitry comprises:

a difference amplifier configured determine the voltage error gradient based on a voltage differential between the first supply voltage and the second supply voltage;

an analog-to-digital converter configured to determine a gray level adjustment corresponding to the voltage error gradient; and adder circuitry configured to add the gray level adjustment to image data to be displayed on the display panel.

11. The electronic display of claim 9, wherein the compensation circuitry comprises:

a voltage ladder configured to determine the voltage error gradient in part by determining a plurality of error voltages between the first location and the second location; and voltage-to-current converter circuitry configured to convert the plurality of error voltages from the voltage ladder to a plurality of error currents, and provide the error currents to a plurality of source amplifiers, wherein the source amplifiers are configured to output a compensation voltage based on the plurality of error currents.

12. The electronic display of claim 9, wherein the compensation comprises a local analog voltage compensation.

13. An electronic device comprising:

an electronic display configured to display image data, wherein displaying the image data comprises performing an analog compensation to compensate for a supply voltage error that varies across the electronic display; and processing circuitry configured to generate the image data, wherein generating the image data comprises performing a digital compensation to compensate for a residual supply voltage error that remains despite the analog compensation.

14. The electronic device of claim 13, wherein the electronic display is configured to perform the analog compensation at least in part by determining a gray level adjustment to the image data associated with part of the supply voltage error.

15. The electronic device of claim 13, wherein the electronic display is configured to perform the analog compensation at least in part by adjusting an operation of different source amplifiers of the electronic display corresponding to different positions in a column driver integrated circuit (CDIC).

16. The electronic device of claim 13, wherein the processing circuitry is configured to perform the digital compensation based at least in part on an expected effect of an average pixel luminance of the image data on the supply voltage error that is not fully accounted for by the analog compensation.

17. The electronic device of claim 16, wherein the processing circuitry is configured to determine the expected effect of the average pixel luminance based at least in part on a two-dimensional lookup table that relates two-dimensional voltage error and the average pixel luminance in different zones of the electronic display.

18. The electronic device of claim 17, wherein the two-dimensional lookup table is symmetrical across the electronic display, wherein only a first half of the two-dimensional lookup table is stored in memory and a second half of the two-dimensional lookup table is obtained based on the first half.

19. The electronic device of claim 17, wherein the two-dimensional lookup table relates to supply voltage error due to a positive voltage supply droop, due to a negative voltage supply rise, or both.

20. The electronic device of claim 17, wherein:

the electronic display is configured to measure supply voltage at a plurality of locations; and the processing circuitry is configured to use the measurements to at least partially determine the two-dimensional lookup table.

* * * * *